United States Patent
Tyson, II

(10) Patent No.: US 11,486,697 B1
(45) Date of Patent: Nov. 1, 2022

(54) OPTICAL STRUCTURAL HEALTH MONITORING

(71) Applicant: John Tyson, II, King of Prussia, PA (US)

(72) Inventor: John Tyson, II, King of Prussia, PA (US)

( * ) Notice: Subject to any disclaimer, the term of this patent is extended or adjusted under 35 U.S.C. 154(b) by 0 days.

(21) Appl. No.: 16/236,081

(22) Filed: Dec. 28, 2018

Related U.S. Application Data

(60) Provisional application No. 62/750,012, filed on Oct. 24, 2018, provisional application No. 62/612,181, filed on Dec. 29, 2017.

(51) Int. Cl.
| | | |
|---|---|---|
| G01B 11/16 | (2006.01) | |
| G06T 7/00 | (2017.01) | |
| G01N 21/33 | (2006.01) | |

(52) U.S. Cl.
CPC ........... *G01B 11/165* (2013.01); *G01N 21/33* (2013.01); *G06T 7/0004* (2013.01)

(58) Field of Classification Search
CPC ...... G01B 11/165; G01N 21/33; G06T 7/0004
See application file for complete search history.

(56) References Cited

U.S. PATENT DOCUMENTS

| | | |
|---|---|---|
| 5,729,471 A | 3/1998 | Jain et al. |
| 5,841,098 A | 11/1998 | Gedrat et al. |
| 5,910,894 A | 6/1999 | Pryor |
| 6,094,625 A | 7/2000 | Ralston |
| 6,195,104 B1 | 2/2001 | Lyons |

(Continued)

FOREIGN PATENT DOCUMENTS

| | | |
|---|---|---|
| EP | 2748800 B1 | 7/2014 |
| WO | 2011073428 A2 | 6/2011 |

(Continued)

OTHER PUBLICATIONS

"Design for Manufacturing: Jigs & Fixtures in Aircraft Industries", Aircraft Design Project AER814, Ryerson University, Feb. 19, 2014.

(Continued)

*Primary Examiner* — Deoram Persaud
(74) *Attorney, Agent, or Firm* — Bonini IP Law, LLC; Frank J. Bonini, Jr.

(57) ABSTRACT

A method, system and devices for optical structural health monitoring that implements digital image correlation (DIC) by applying an invisible pattern comprising a random dot pattern and/or codes, which is applied using a coating containing a dye or substance that is not visible during the normal lighting conditions. The structure is imaged at different time intervals by capturing images of the pattern and codes using a camera and suitable light source. The captured images of the pattern and codes are stored in a CAD file that represents the structure or part to which the pattern and codes are applied, and includes the locations of the pattern and codes. Comparative measurements of the pattern and codes (e.g., using DIC) determine one or more structural health parameters, such as strain, deformation, and other stresses or averse conditions that may be detected from one interval to another (e.g., between measurements).

42 Claims, 15 Drawing Sheets

(6 of 15 Drawing Sheet(s) Filed in Color)

(56) References Cited

U.S. PATENT DOCUMENTS

| | | | |
|---|---|---|---|
| 6,400,374 B2 | 6/2002 | Lanier | |
| 6,644,764 B2 * | 11/2003 | Stephens, Jr. | G06K 1/121 347/107 |
| 7,054,793 B2 | 5/2006 | Moritz et al. | |
| 7,110,909 B2 | 9/2006 | Friedrich et al. | |
| 7,372,558 B2 * | 5/2008 | Kaufman | G01B 11/2513 356/601 |
| 7,532,332 B2 | 5/2009 | Gomercic | |
| 8,413,878 B2 | 4/2013 | Hackius et al. | |
| 8,610,761 B2 | 12/2013 | Haisty et al. | |
| 8,749,396 B2 | 6/2014 | Maggiore | |
| 8,982,156 B2 | 3/2015 | Maggiore | |
| 9,037,297 B2 | 5/2015 | Hosek | |
| 9,530,244 B2 | 12/2016 | Acree | |
| 10,081,443 B2 * | 9/2018 | Engel | B64F 5/60 |
| 10,226,944 B2 * | 3/2019 | Kerr | B41J 3/4073 |
| 10,497,110 B2 * | 12/2019 | Szarski | G06T 7/74 |
| 2007/0127015 A1 * | 6/2007 | Palmateer | G03B 29/00 356/237.1 |
| 2007/0165245 A1 | 7/2007 | Gomercic et al. | |
| 2009/0195753 A1 * | 8/2009 | Dill | G03B 21/26 353/30 |
| 2010/0088788 A1 * | 4/2010 | Chasiotis | D02G 3/22 850/33 |
| 2010/0235037 A1 * | 9/2010 | Vian | G05D 1/0027 702/183 |
| 2010/0310128 A1 * | 12/2010 | Iliopoulos | G01M 5/005 382/103 |
| 2012/0007852 A1 | 1/2012 | Morale et al. | |
| 2012/0303336 A1 | 11/2012 | Becker et al. | |
| 2014/0098936 A1 * | 4/2014 | Grossnickle | G01N 23/087 428/209 |
| 2015/0043011 A1 * | 2/2015 | Kaufman | G01B 11/245 356/614 |
| 2015/0338287 A1 | 11/2015 | Chen et al. | |
| 2015/0350617 A1 * | 12/2015 | Chevassus | H04N 9/3191 348/745 |
| 2016/0264262 A1 * | 9/2016 | Colin | B25J 19/023 |
| 2017/0016862 A1 * | 1/2017 | Holmes | G01N 29/4427 |
| 2017/0052150 A1 * | 2/2017 | Zalameda | G01N 29/043 |
| 2017/0210489 A1 * | 7/2017 | Bode | G05B 19/41805 |
| 2017/0281009 A1 * | 10/2017 | Obropta, Jr. | A61B 5/442 |
| 2018/0335296 A1 * | 11/2018 | Golovashchenko | G06T 7/62 |
| 2019/0265200 A1 * | 8/2019 | Ihn | G01M 5/0091 |
| 2019/0310076 A1 * | 10/2019 | Georgeson | G01M 5/0091 |
| 2020/0230899 A1 * | 7/2020 | Tyson, II | B29C 70/386 |
| 2020/0340802 A1 * | 10/2020 | Tyson, II | B64F 5/60 |

FOREIGN PATENT DOCUMENTS

| | | |
|---|---|---|
| WO | 2011073428 A3 | 6/2011 |
| WO | 2016198678 A1 | 12/2016 |

OTHER PUBLICATIONS

"Strain Transformation and Rosette Gage Theory", AE3145 Strain Transformation and Rosette Gage Theory, pp. 1 to 7, http://users.tamuk.edu/kfldp00/MEIE_Peel_website/Courses/Meen5330/strain-gage-rosette-theory_GA_Tech.pdf.

Barranger, John P., "Two-dimensional Surface Strain Measurement Based on a Variation of Yamaguchi's Laser-Speckle Strain Gauge," Conference on Optical Testing and Metrology III, Society of Photo-Optical Instrumentation Engineers, San Diego, CA Jul. 8-13, 1990, NASA Technical Memorandum 103162.

Wontae Kim, Ranjit Shrestha, and Manyong Choi, "Defect detection with thermal imaging and phase shifting methods in lock-in thermography", 10.21611/qirt.2016.057, Department of Mechanical & Automotive Engineering, Kongju National University, Cheonan, Republic of Korea, pp. 391-396, 13th International Conference on Quantitative Infrared Thermography, Jul. 4-8, 2016, Gdańsk, Poland.

Bojan Milovanovic and Ivana Banjad Pecur, "Review of Active IR Thermography for Detection and Characterization of Defects in Reinforced Concrete", J. Imaging 2016, 2, 11, pp. 1-27, Apr. 7, 2016.

Tzuyang Yu, et al., "Structural Health Monitoring of Bridge Abutments using Imaging Radar and Digital Image Correlation," Collection of SHM Case Studies by ASCE SEI Methods of Monitoring Committee, Feb. 12, 2016.

Jovan Jovicic et al., "Argus Formability Solution", AN1709-AN1710, Jun. 2018, https://www.researchgate.net/publication/325907960.

Dr. R. Uday Kumar, "Analysis of Major Strains and Minor Strains in Sheet Metal Forming", International Journal of Application or Innovation in Engineering & Management (IJAIEM), vol. 2, Issue 2, Feb. 2013, ISSN 2319-4847.

Dr. N S Mahesh, "Sheet Metal Forming Technology", M.S Ramaiah School of Advanced Studies—Bangalore.

Richard Gedney, ADMET Inc., Norwood, Massachusetts, "Sheet Metal Formability", Advanced Materials & Processes, Aug. 2002.

* cited by examiner

Sample QR Code (2D barcode)

OPTICAL STRUCTURAL HEALTH MONITORING

CROSS-REFERENCE TO RELATED APPLICATIONS

This application claims the benefit to U.S. Provisional Application 62/750,012, filed on Oct. 24, 2018, and U.S. Provisional Application 62/612,181, filed on Dec. 29, 2017, the complete contents of which are incorporated herein by reference.

BACKGROUND OF THE INVENTION

1. Field of the Invention

The present invention relates to the field of inspection and monitoring of structures and components, and in particular to methods, systems and devices for measuring strain and deformities that may exist in a structure or object, including those occurring over time.

2. Brief Description of the Related Art

Components and structures that are in use and subjected to forces typically are monitored to determine whether changes have taken place that may render the structure or component unsuitable for use. For example, in the field of aircrafts, currently, most aircraft inspection is based on human Visual Inspection (VI), where the inspector looks at each component and makes a determination if the part is healthy or not. This is done by the pilot before each flight with a walk around the aircraft, and continues on for maintenance A, B, C & D Checks, each being more detailed. The checks are carried out at predetermined times based on the number of flight cycles (i.e., landings and take-offs) or flight time. An A-Check is a light check, which may be carried out usually overnight, at an airport gate. The A-Check is carried out monthly, or every 500 flight hours, although this timing may change depending on the aircraft type. The B-Check also is a light check and typically is carried overnight at an airport gate, about every three months. A C-Check is carried out on an aircraft every 18 months to two years (depending on type of aircraft) and usually takes about three weeks. An aircraft may undergo upgrades, e.g., to the interior, which may be coordinated with the C-Check timing. The D-Check is the most extensive. During a typical D-Check, about every 5 to 6 years, depending on the aircraft type. During a typical D-Check the interior is removed and the inside of the fuselage, including the skin, frames and stringers, is visually inspected. There are also may be specific requirements to test specific structures with a nondestructive testing (NDT) methods like eddy current or ultrasonics to detect cracks or corrosion (e.g., or other monitored FAA tests). When the D-Check is carried out, the entire aircraft is basically dismantled and put back together. For example, components in the cabin are taken out (such as the seats, toilets, galleys, and overhead bins) in order to allow the engineers access to inspect the metal skin of the aircraft, from the inside out. But the D-Check not only involves the interior, the engines also are taken off, and the landing gear is removed and overhauled with the aircraft supported on massive jacks. All of the aircraft systems are taken apart, checked, repaired or replaced and reinstalled. The cost of carrying out a D-Check on an aircraft is substantial, involving several million dollars for each D-Check, and the aircraft typically is out of service, as the D-Check usually will take about three to six weeks to complete. In some instances, an aircraft will need to be relocated to an inspection facility where the D-Check may be carried out.

A number of next generation aircraft are being made more of composite structures, which do not show their damage well visually. They typically carry strain without noticeable changes until catastrophic failure, typically complete fracture, like a composite fishing rod that bends and bends until it snaps.

SUMMARY OF THE INVENTION

The present invention provides a method, system and devices for Optical Structural Health Monitoring. According to preferred embodiments, Optical Structural Health Monitoring is carried out with an optical strain measuring tool, and preferably, with a technology referred to as Digital Image Correlation (DIC). DIC uses an applied pattern on the surface of a material to measure its surface strain, like a single point electrical strain gauge, but can image the entire surface of the materials, imaging the true material strain, like a computer model or Finite Element Analysis (FEA) models this strain.

According to preferred embodiments, the system, method and devices may be used to conduct structural health monitoring without the need to contact the substrate or item being monitored or evaluated. The structural health monitoring may be carried out in real-time, so that there is no requirement for on-board sensors or equipment, with weight and requiring power (weight and power requirements being detriments to aircraft operations).

According to some embodiments, the measurements preferably take place on a paint pattern, which may be an embedded pattern of a coating, such as paint (e.g., a paint pattern). According to some implementations, the pattern may be applied to a substrate, and remain visible thereon, while other embodiments may provide an invisible pattern and/or codes. According to some embodiments, the measurements preferably take place on an embedded UV pattern placed on the substrate that is to be measured over time (e.g., using a UV coating, such as a UV paint or ink). DIC may be implemented using the pattern, such as the visible pattern indicia according to some embodiments, and the UV pattern indicia according to other embodiments to conduct the structural health monitoring.

The system preferably includes a computer or server with a database, and software containing instructions for storing the images and their UV patterns (or in some embodiments the visible patterns) for the structure of interest, taken at different time intervals (e.g., periods of use, periods of inactivity, or other metric), from which comparative measurements may be made to determine one or more structural health parameters, such as strain, deformation, and other stresses or averse conditions that may be detected from one interval to another (e.g., between measurements).

In carrying out the Digital Image Correlation, One of the requirements of DIC is to image a pattern is imaged on the surface of an object, the pattern typically consisting of a random dot pattern of specific sizes, like a leopard pattern across the entire surface of the material that stays with the part, "measuring" it. The initial pattern measurement provides the initial 3D coordinates of the material surface. The initial pattern measurement may be considered to be a baseline for the known condition at the time at which the pattern is applied. Each successive 3D imaging measurement compares the changes in 3D displacement (deformation, like bending), and local surface strain (material stretching to fracture), which detects pre-fracturing and cracking (failure). The subsequent measurements involve imaging the object to detect the pattern, and identify areas where the pattern has changed. For example, in the case of a dot pattern, the dots forming the pattern are at locations at the initial baseline imaging. Where the dots are in different locations, the position to which a dot has moved, as well as the extent and direction of movement (for example along coordinates, such as, for example, an x,y,z coordinate system) may be ascertained.

Patterning internal structures (such as for a D-check, with enhanced visual inspection for structural health monitoring) with a quality analysis pattern, is a concern before acceptance of the technology, because it can hide issues from the accepted human visual inspection. Apart from the potential for visual distraction during inspections, typically, most owners of the asset being monitored do not want the outside of their structure, such as an airplane, painted with dots. Some embodiments of the system, method and devices may be implemented with an invisible paint or coating, such as a UV paint, as the UV pattern does not hide or inhibit visual inspections, and is suitable for a number of applications (where visible patterns would inhibit or detract from the surface or object).

The present method, system and devices provide patterning methods, including an invisible patterning method that may be seamlessly integrated with existing structures as well as the appearances of the structures. The method, system and devices may be used to carry out structural health monitoring of structures without disrupting the appearance of the structure. According to embodiments, the method, system and devices provide an invisible pattern that may be imbedded into the normal paint used.

According to preferred embodiments, a coating is used, such as a paint or ink, that contains a substance that is not visible under normal viewing conditions, but is visible in the presence of light of a particular wavelength, such as fluorescent or UV spectral wavelength light, making the applied pattern and codes ascertainable during an inspection. The use of the revealing light, in some circumstances may be visible only to a camera having an image sensor that covers the wavelength of the dye compound or additive, while in other embodiments, the use of a light of a suitable wavelength may also reveal to humans a visual appearance of the pattern on the structure.

According to a preferred embodiment, a fluorescent dye is provided in the paint or other coating formulation that is used to create the pattern. For example, where a UV fluorescing compound is provided in the coating applied to form the pattern, the method then employs the use of an Ultraviolet (UV) light to see the pattern during an inspection. The pattern is provided on the structure, however it does not inhibit visual inspection, nor is it seen on the surfaces.

One of the requirements of Optical Structural Health Monitoring with DIC is to image the initial condition of the structures from which to compare any changes. Structural health monitoring measures the quality of structures for years, so storing the information for years is critical. Aircraft, bridges and buildings have very large surface areas. The method provides the capability to recover the initial image(s) of the same area as that being measured, simply and automatically.

Optical structural health monitoring (SHM), conducted according to embodiments of the system, method and devices, may also be used for interior skin measurements of an aircraft or other structure, providing enhanced visual inspection. For example, the utilization of ARAMIS to inspect the patterns may provide the power of millions of strain gages. This may be used for crack detection and the plastic strain of overloaded structures, like frames (radial), and stringers (axial) of an aircraft.

The method is carried out by obtaining a precise position and orientation of the imaging device so that the reference point from which the pattern is imaged although relative to the location of the imaging device, is known based on the imaging device position. Knowing precisely the position and orientation of the imaging device is critical. The present system, method, and devices may utilize information in the image to determine the position and orientation. According to some implementations, the information in the image may be used for knowing position and orientation. According to some embodiments, a random dot pattern may be used to determine the position and orientation of the imaging device. Although preferably a random dot pattern is different everywhere or almost everywhere (hence the randomness), it may be used, but it may be difficult to compare with the original and/or last previous location of that pattern or pattern portion.

According to some other embodiments, a specific dot pattern may be used and cataloged.

According to preferred embodiments, the imaging device position and orientation is determined with the use of coded markers in the field of view. The coded markers may be numerically unique, which provides for more distinctions for discrete markings and their identifications.

According to some preferred implementations, the method, system and devices utilize 2D QR codes, and may mark these on the structure. Embodiments of the method system and devices imprint onto the surface of a structure information that may serve as an orientation and position indicator, as well as a part repository of part specific information. According to preferred embodiments, a QR code utilized in the present method and system may provide the component information as well as serve as position and orientation designators. According to preferred embodiments, the QR code may store substantial information, like part no., serial no., location, and other details. Embodiments of the present method and system also utilize QR codes that are finely printed and may be used by DIC as its local random pattern. The use of the QR code as a local random pattern for which DIC measurements may be ascertained, may be applied to the structure surface in a manner and in locations that does not block the surface measurements.

According to preferred embodiments, one or more QR codes are applied onto a surface of the structure or asset to be monitored, and preferably, the one or more QR codes are applied on the surface, and a pattern, such as for example a random dot pattern, also is applied on the surface. According to some embodiments, the patterns are non-overlapping patterns or codes, or patterns and codes are provided having different frequencies of excitation, or wavelength (e.g., different colors). For example, when exposed to light of a particular wavelength, one pattern or code may be revealed (e.g., such as a first pattern), whereas when exposed to another wavelength (or frequency), another pattern (such as a second pattern) may be revealed, but not the first pattern. For example, codes may be applied using a particular paint having a first wavelength or frequency for viewing, which is different than other patterns applied. The codes also may be security protected, so that even if revealed (using an appropriate wavelength of light) the code cannot be read without a decoder (which may be included or provided as part of the system). The QR code that has been applied to the surface of an asset to be monitored may be used by imaging to identify a position on the part, the part number, serial number, age, location (and/or other information), and provide a reference for the other indicia of the pattern (the dots of the random dot pattern). Preferably, the codes, such as a QR code, or circular code, or numerical code or combinations of these codes are applied to the surface of a structure along with the random dot pattern, so that the structure is marked with codes and a pattern.

According to preferred implementations, the pattern and the QR codes may be printed with an inkjet (paintjet) printing capability. The inkjet/paintjet printer preferably includes a print head with at least one, and preferably an array of fine nozzles, which is carried on a movable support. According to a preferred implementation, the movable support with the print head thereon is moved over the surface of the part to which the codes and/or pattern are to be applied, and the nozzles dispense the application compound (such as a paint, ink or dye) in the desired locations on the part surface. The print head may be configured to be part or location specific, or customized to provide the application of the coating (e.g., paint or ink) in the location or locations of the part desired. Preferably, the compound being applied through the inkjet or paintjet nozzles contains a compound, such as a UV fluorescing compound, that will exhibit visibility only under certain wavelengths, and not the lighting conditions under which the subject part is typically used.

According to some embodiments, the pattern and codes may be applied to the surface of the structure with a robotic mechanism. For example, according to some embodiments, a robot that has one or movable arms, or segmented arms may be provisioned with a print head thereon. The print head and robot preferably may be connected to a computer or other device that includes software and a hardware processor for controlling the movements of the robot over the surface of the part, and for controlling the printer head to print a pattern onto the surface of a panel as well as to print codes, such as QR codes. In addition to the use of a robot for application of the pattern and codes, the robot may also be used to image the pattern and codes on structure during monitoring and measuring operations.

According to preferred embodiments, the pattern is applied to the structure as an invisible pattern. The invisible pattern is preferably one that is not visible to the human eye under normal lighting conditions (conditions of use of the structure or part). For example, where the structure is designed to be used in a normal course of operations, such as a motor vehicle, aircraft, or other item, the exterior surface appearance may be maintained as the customer or owner of the substrate (vehicle, aircraft, or other item) may desire (e.g., with the customer color scheme and/or logos). According to preferred embodiments, an ink is used that may be viewed and imaged by an imaging component, such as a camera, but which may not be visible when viewed unassisted by some type of viewing technology. A preferred implementation is to provide a UV fluorescing substance, such as an ink or paint, which preferably is not visible during normal light conditions. The UV paint may be visible in one or more spectral regions, such as, for example, the ultraviolet spectral region, or at one or more particular wavelengths, where imaging instruments, such as a camera having an image sensor that can detect UV light or the spectral wavelength range of the paint or ink, may capture the UV paint pattern on the substrate. Preferred embodiments capture the UV fluorescence of the substance such as the paint or ink comprising the pattern. According to some embodiments, the UV patterning and codes are applied over the surface of the substrate. In some embodiments, a UV coating, such as UV paint, is applied on top of the existing surface, including over a surface treatment, such as a surface color or painted surface. For example, the UV patterning and code applications may include applying the UV paint or ink directly on the substrate surface, including even on an image that is on the substrate surface, such as for example, surface paint, logos, stripings, or designs of the substrate (e.g., an aircraft logo).

According to some other embodiments, the UV pattern paint or ink is mixed with the surface color or paint and is applied to provide the pattern, but in a manner where the color of the structure (natural color or painted color) is matched to the UV ink or paint. In this manner, although the UV pattern may be applied, the pattern is not noticeable to a viewer, but may be detectable under certain lighting conditions (e.g., UV wavelength lighting). According to some alternate embodiments, the surface may be further treated with a coating that preserves the UV applied indicia (e.g., pattern and codes). For example, according to some embodiments a clear coat (overcoat) may be applied over the UV applied paint or ink to provide additional protection for the UV ink or paint (and which permits the imaging of the UV pattern through the overcoating).

In order to view the UV applied pattern (and codes) an imaging component that has a sensor that may capture the UV light from the pattern is used. A UV light source may be directed at the structure, and the UV pattern will be revealed. The imaging system, which may comprise a camera may then, under conditions where the UV pattern is exposed to UV light, image the pattern and store the images. This may be done in one or more image captures.

The UV applied pattern preferably is one that has long-term pattern survivability. Therefore, when a structure being monitored is tested, the UV pattern survives at least an initial testing period, and may survive over multiple monitoring cycles. For example, the UV pattern may be provided to remain on the structure, such as, an aircraft for example, between one or more successive A-Checks, or B-Checks, or for longer durations.

In the case where the UV pattern is imaged, it can provide a baseline for subsequent measurements. For example, the UV pattern may be coordinated with the CAD file coordinates of the substrate. The pattern and substrate may be imaged together and the UV pattern stored as coordinates (e.g., x-y-z-system). If some of the pattern remains, it may be used in reference to the saved coordinates. Using invisible UV fluorescing pattern the component can be tracked with thousands of measurement points. A CAD based database containing the part information, including the CAD coordinates, is utilized in conjunction with the imaging pattern. According to some embodiments, the UV patterning is carried out in connection with the RVAT system, which records the as-built structure or component assembly, and represents the actual part built in CAD. An RVAT database may be generated or supplied that includes the CAD information for the substrate (such as a part or assembly) to which the UV patterning is applied. The RVAT database preferably includes the as-built information, including the CAD information for the actual substrate part, which may be termed a Digital-Twin. The application of a UV fluorescing pattern and codes to a substrate, such as, for example, a surface of a vehicle, aircraft or article of manufacture, permits the imaging evaluation to detect changes in the structure, even when the changes may not be visible to a human inspection. Documenting every measurement within the RVAT Database (the Digital-Twin), RVAT Analytics can see slight variations in response, exposing structural defects. RVAT Dimensional NDE Structural Health Monitoring provides: Detection of Local Shape (3D Deformation) Change for detection of Barely Visible Damage to substantial internal damage, and Detection Local Strain Change for detection of structural damage to substantial internal damage. The UV pattern application may be used in conjunction with one or more other structural health monitoring applications, such as, for example, thermography (e.g., NDE thermography). RVAT Thermal Response NDE Structural Health Monitoring provides early detection of delaminations, water intrusion and other defects or conditions. Continuous RVAT Structural Health Monitoring allows designers to reduce design safety factors reducing cost and increasing performance. The pattern applications may be used in conjunction with RVAT Thermal Response NDE Structural Health Monitoring.

The RVAT system and Digital-Twin are shown and described in my U.S. patent application Ser. No. 62/612,181, filed on Dec. 29, 2017, the complete contents of that patent application of which are herein incorporated by reference.

The UV pattern may be captured by the imaging component, such as a camera, and stored at each interval at which the structure is evaluated. A database of structural health may be produced, capturing and storing date for the structure over time, and identifying the pattern and codes on the structure, and changes to the structure based on the changes to the pattern and codes. However, according to some embodiments, the codes are configured and applied so as to retain suitable integrity for identifying the information that the code represents (e.g., part number, serial number). According to other embodiments, the codes themselves are provided in any location, including where strain or other monitored condition, may be expected to occur. In some embodiments, a code may be applied at particular location or locations on the structure.

The UV pattern itself may be compared to the previous imaged pattern (which was stored in a database from the previous pattern imaging, e.g., a prior health check), or from the initial condition when the pattern was first applied. The UV pattern may be compared using the CAD related stored information where the UV pattern from a previous or initial imaging, has been stored and represented in CAD (such as using the RVAT technology application). The structural health monitoring enables the detection of problems that are likely to arise, and provides the capability to detect these potential problems at an advance time (before the actual damage is no longer repairable, or results in a detrimental failure event). It is noted that the pattern and codes may be applied to a structure before the structure is placed in use, or alternatively, may be applied to an in-use structure, and may be reapplied to a structure when required (when the pattern has worn, or when the structure has been altered—repaired or repainted, or other transformation). For example, where a UV pattern previously applied no longer is present in a suitable amount or degree to ascertain measurements, the pattern may be reapplied. Knowing the UV pattern longevity application, or useful life (which may depend on certain exposures to elements, weather, chemicals, and other conditions), may be used to determine when reapplication of the pattern is required. For example, during repainting or certain refurbishments of a structure to which the UV pattern has been applied, the pattern may be reapplied as needed, e.g., where a substrate, such as an aircraft is undergoing repainting.

The present system, method and devices preferably are utilized in conjunction with CAD coordinates. The present system includes one or more databases which store information about the substrate. A database needs store the information of every image based on 3D coordinates or positional information. Our RVAT database product, stores the initial 3D computer design drawings (CAD/FEA), the initial 3D scan (3D measurement of part), the initial structure DIC patterns and the coded marker locations, as well as any other Digital Thread data associated with the part. The RVAT database allows the link between the current measurement image with the entire digital thread of the structures life.

Comparison of measurements through time can show slight changes, like developing strains, damages, developing cracks, with magnitudes more sensitivity than human visual inspection. Data analytics, likely enhanced with machine learning, will allow the thousands (millions) of images and data from Optical SHM of entire structures, to be analyzed. Results can be quite complex, strains, such as manufacturing strains from internal structure, will not change over time and so can be ignored, but even very slight changes can indicate a developing problem, even internally. Early detection of problems can be scheduled in the next maintenance and lead to lower maintenance costs, better safety and performance, and life extension.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 12 is an illustration showing the detection of a defect using measurements to detect slight changes over time of shape, 3D deformation and strain of a structure.

FIG. 16 is an illustration of an image of an aircraft illustrating the use of the Digital-Twin to define damage tolerances, showing detection of a critical defect.

DETAILED DESCRIPTION OF THE INVENTION

Figure 1:
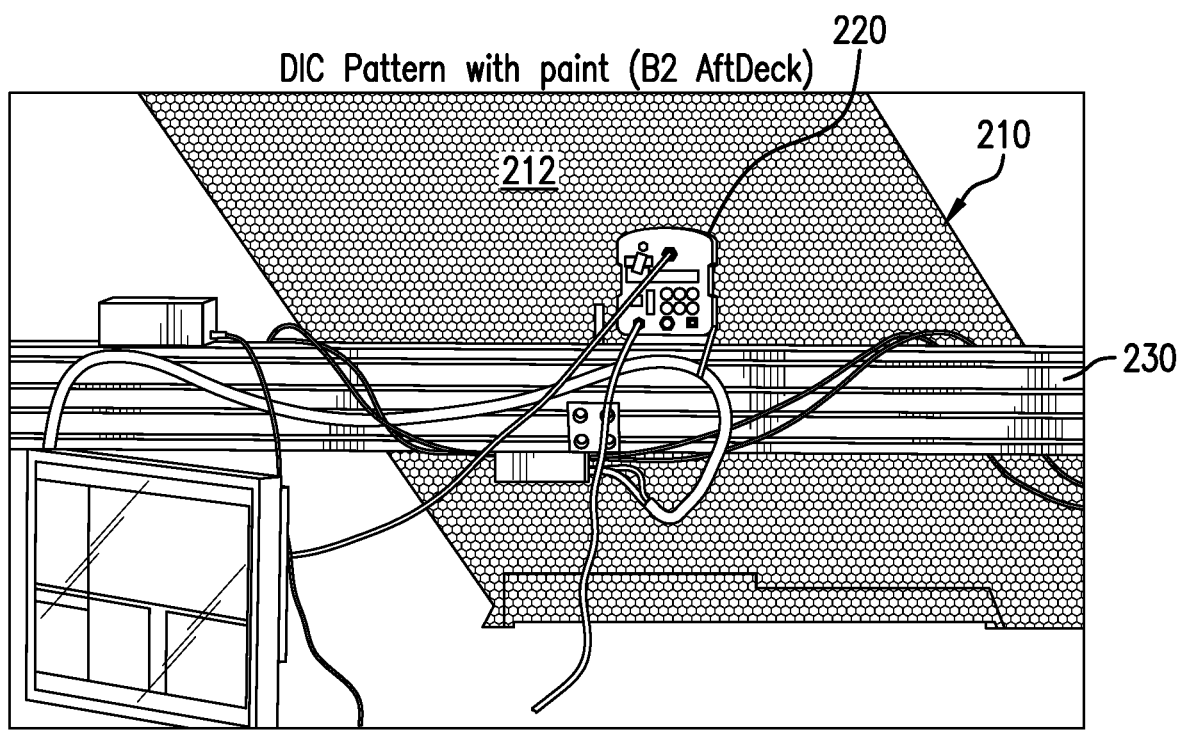
FIG. 1 is a side view of an aircraft panel that comprises the aft deck panel of a B2 aircraft.

Referring to FIG. 1, there is depicted a panel 210 of an aircraft. The panel 210 is an aft deck panel of a B2 aircraft, located at the rear of the aircraft, which comprises a metallic panel on the bomber's upper surface that shields its composite airframe from the heat of engine exhaust. The panel 210 therefore is susceptible to a variety of conditions, including, for example, strain as well as heat. The aft deck panel 210 is shown having a pattern 211 on its outer surface 212. In this exemplary embodiment, the pattern is comprised of indicia that are dots. The panel 210 in FIG. 1 shows a preferred example of a dot pattern that has been applied to the panel surface 212. The pattern may be applied using a suitable application means, some examples of which may include painting, printing, and the like. According to a an exemplary embodiment, the pattern may be applied with a paint or ink. Preferably, the painted on pattern must remain on the panel for the duration of the testing period. For example, the testing period may be the expected useful service life of the part, such as the aft panel of the aircraft in the example of FIG. 1, or could be shorter or longer (e.g., the maximum period of in-service use for the part being measured). The pattern may be reapplied as needed (where the prior pattern is removed so that the pattern may be reapplied).

Figure 6:
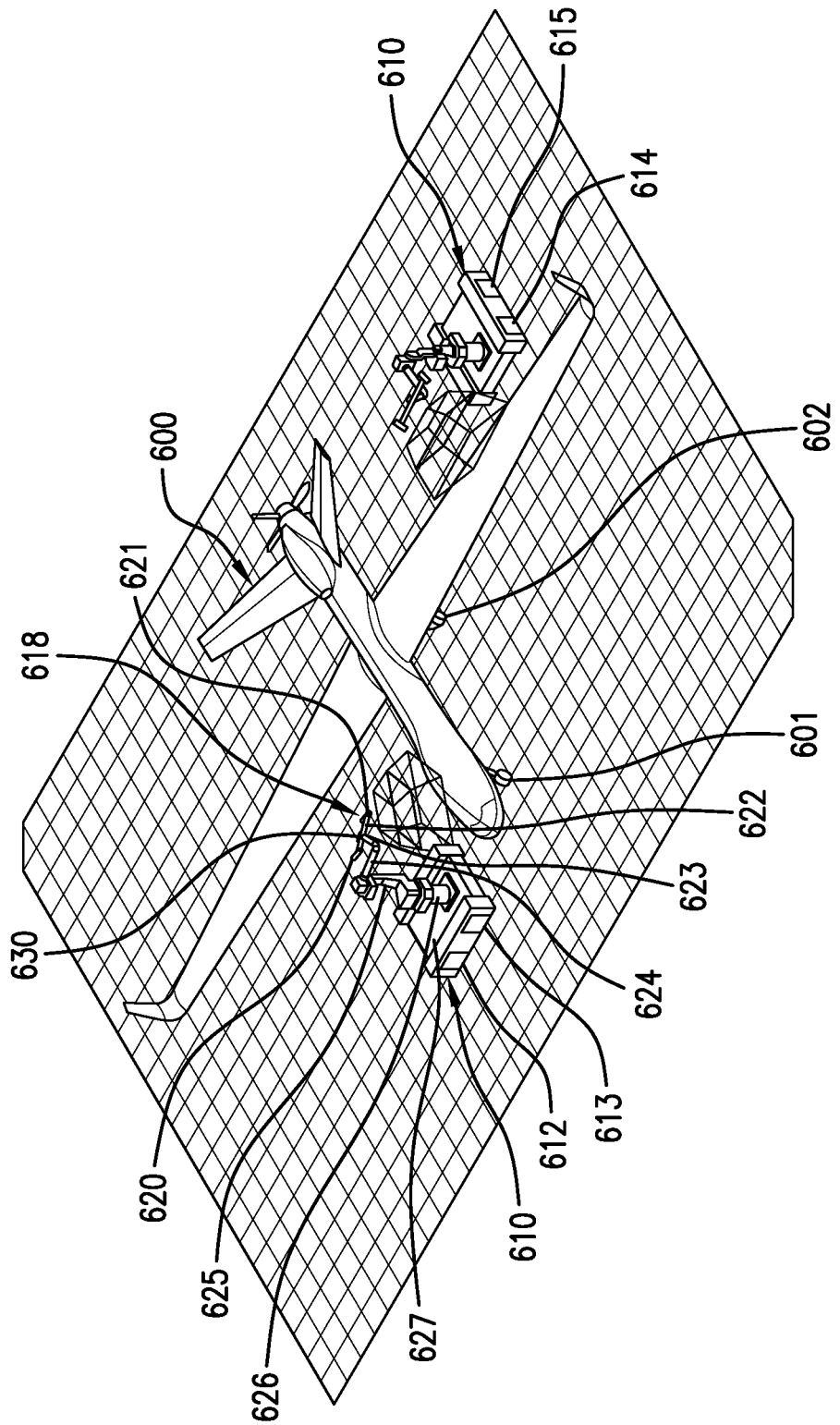
FIG. 6 is a perspective view showing an aircraft, and illustrating exemplary devices, comprising robots, for conducting the measurement of the aircraft surfaces (which have been patterned), and which the robots measure by imaging the surfaces.

In FIG. 1, a digital image sensor or camera 220 is shown positioned in front of the panel 210. The camera 210 is shown mounted on a frame 230. In the view depicted, the camera 220 may image the entire panel 210 in a single image, however, according to some alternate embodiments, the camera 220 may be mounted on a frame 230, and the frame 230 may be movable provided, or the camera 220 mounted for movement along the frame 230, or relative to the frame 230. According to some embodiments, the camera 220 may be mounted on a frame that has vertical and horizontal sections, along which the camera 220 may move to image the panel, such as the panel 210, from different locations. The camera 220 also may be mounted to tilt so that movement of the camera 220 along an x-y-z coordinate path and locations may take place. According to alternate embodiments, the camera 220 may be mounted or associated with a robot, as depicted in FIG. 6.

Figure 2:
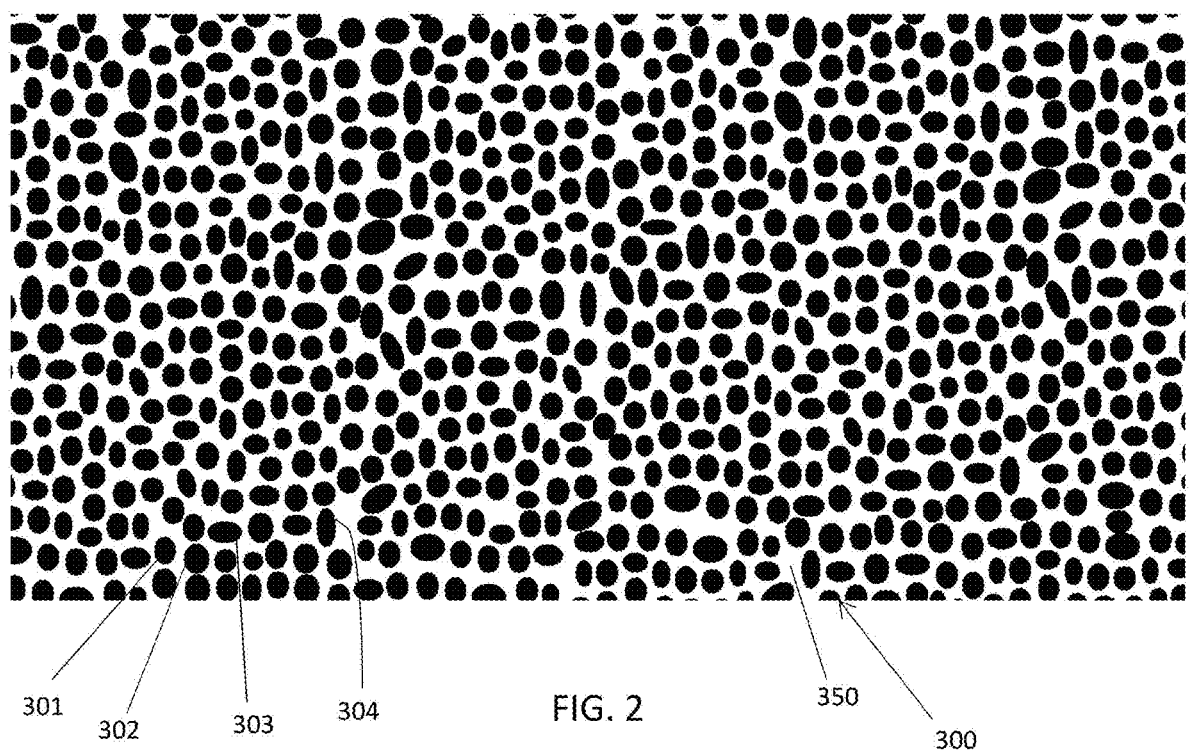
FIG. 2 is a plan view showing a random pattern of simular sized dots.

Referring to FIG. 2, there is illustrated an exemplary depiction of a DIC Pattern 300 shown comprising a random pattern of simular sized dots 301, 302, 303, 304 . . . , which are shown provided on a field or background 350. The dot pattern 300 may be used to produce a Vinyl (or simular) screen having the random pattern of simular sized dots, such as the exemplary pattern illustrated in FIG. 2. According to a preferred embodiment, the dot pattern 300 may be provided on a vinyl screen, where the background 350 may represent the vinyl screen material, and where the dots, such as those 301, 302, 303, 304 (and others . . . ), represent openings in the screen (or background 350) through which a coating medium, preferably a UV coating medium, such as a UV paint or UV ink, may be applied. The screen preferably permits the dot pattern to be applied to the surface of a structure, such as, for example, the panel 210 shown in FIG. 1. According to some embodiments, the screen may be placed on the panel surface, and the dot pattern, such as the pattern may be applied to a surface of a structure using a suitable UV coating, such as a UV paint or ink, over the screen.

Alternatively, the pattern, such as the random pattern 300, or other patterns and codes shown and described herein, may be applied by printing it onto the panel surface with one or more printing heads that dispense the coating (e.g., paint or ink). For example, according to one implementation, the paint may be applied by positioning the panel or structure at a desired location to receive the patterning. The print head may be carried on a frame, such as, for example, a gantry that moves the print head relative to the surface to which the pattern is being applied.

According to embodiments of the invention, the system, method and devices may be used to apply patterns to existing structures, including structures that are already in use and have markings or decorations on them (such as logos or other markings that the item or structure may be required to display).

Figure 3:
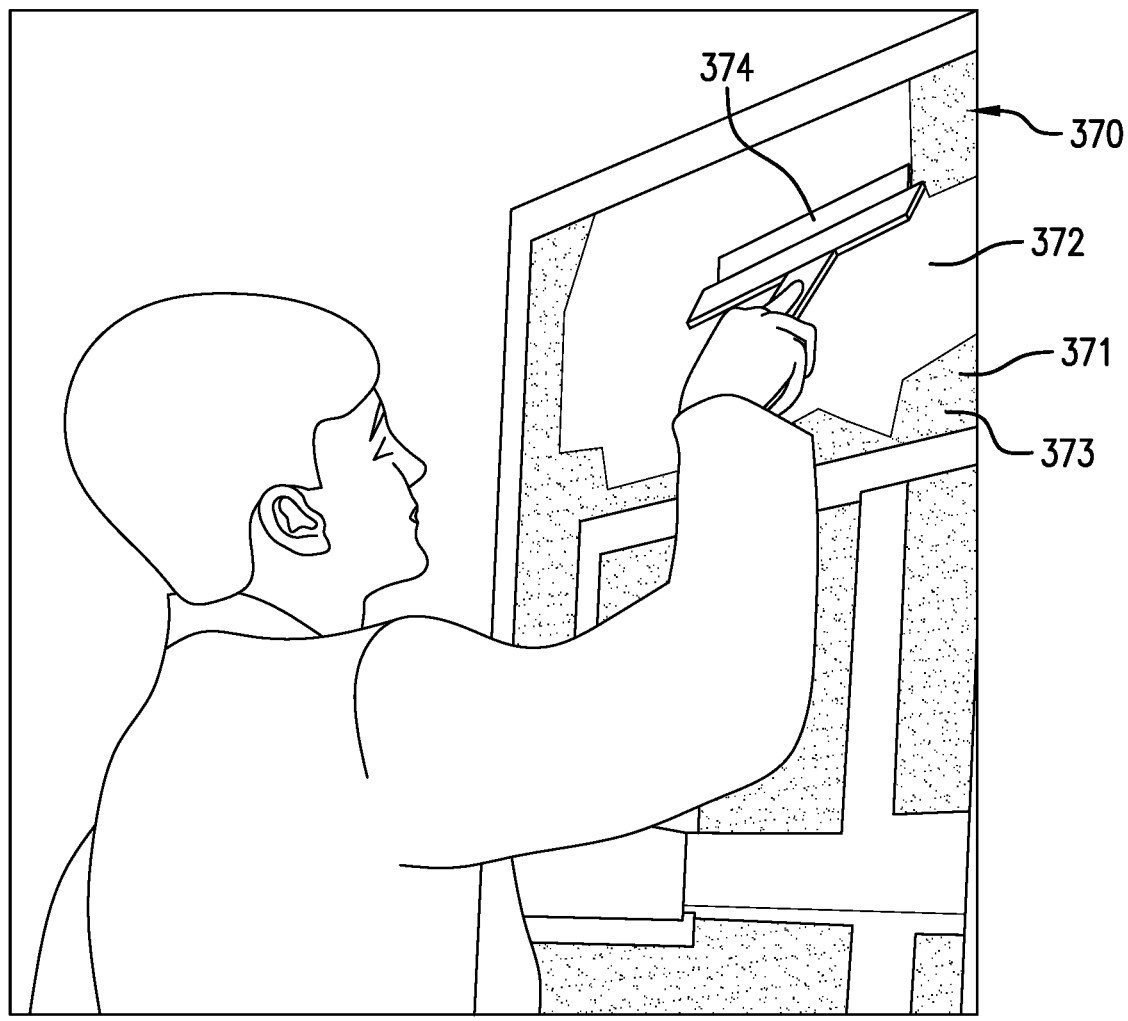
FIG. 3 is a perspective view of a Vulcan Spacecraft Panel, under test to failure, that is illustrated in connection with a pattern being applied to the panel, manually.

Referring to FIG. 3, there is illustrated a substrate 370 shown comprising a Vulcan Spacecraft Panel under test to failure. An application of a pattern 371 is applied to the panel surface. The depiction in FIG. 3 shows the manual application where a coating 372, such as a paint or ink, is applied over a screen 373. The screen 373 has openings (see the plurality of dark dots or random indicia pattern) to produce the desired randomized dot pattern (or other desired shaped pattern) including with the codes (QR, numerical, and the like) that may be applied with the dot pattern. In the exemplary depiction, the screen 373 is positioned on the panel or substrate 370, and the person uses a roller 374 to spread the coating (e.g., a UV paint) over the surface of the screen 373, where the paint passes through the pattern 371, which comprises openings in the screen 373 that form the pattern 371. The paint preferably is UV paint that is not visible under normal lighting conditions under which the substrate, such as the panel, is used. Preferably, the users as well as those viewing the aircraft (in this example) will not identify the applied pattern. However, the pattern may be viewed and imaged under the imaging conditions where a suitable wavelength, such as a UV wavelength of light (or other light wavelength that is compatible with the coating used), is directed at the panel 370.

According to some embodiments, where the applied pattern is used for testing, and not in public use, the pattern may be applied to remain visible on the surface of the substrate.

The pattern may be imaged and stored prior to the testing, and may be associated with the CAD drawing of the imaged part, so that the pattern is mapped to x,y,z coordinates of the CAD. According to preferred embodiments, a UV fluorescent coating, such as a paint or ink, may be used for testing purposes, if desired.

Figure 4:
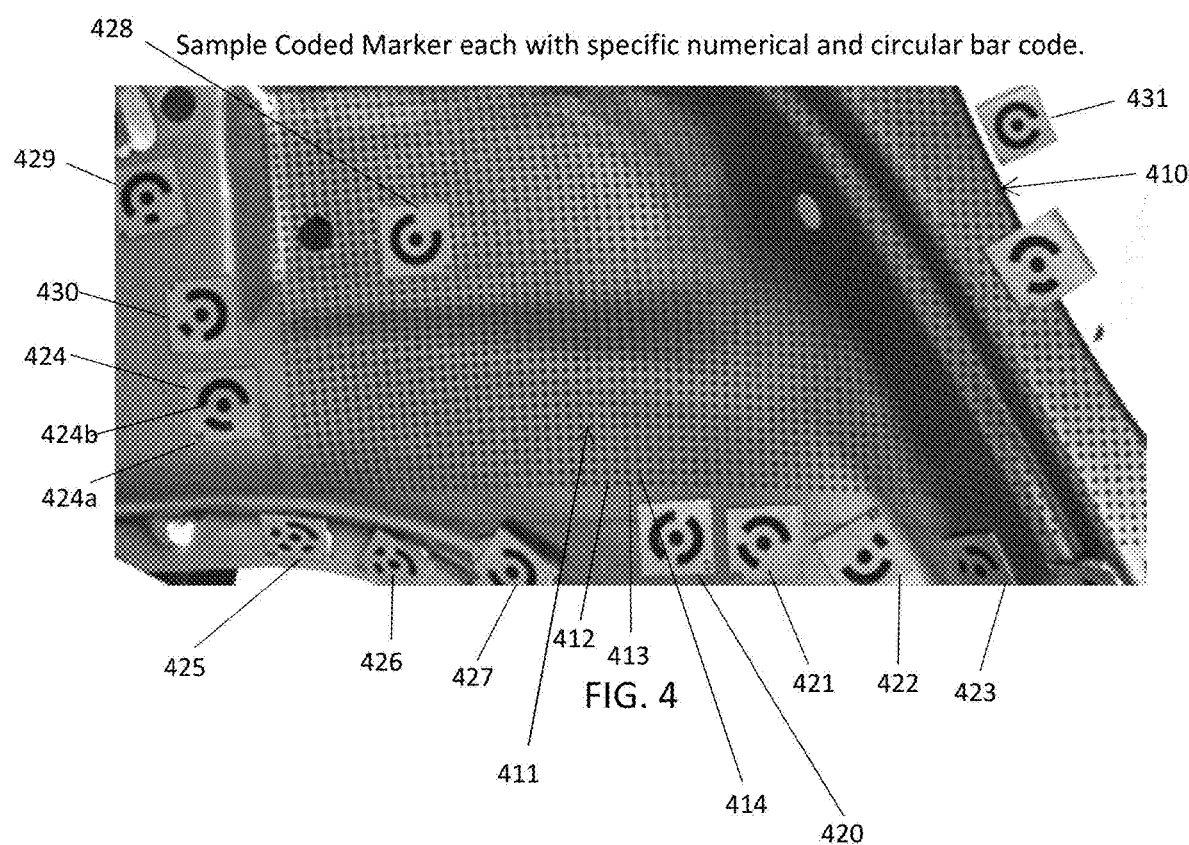
FIG. 4 is a plan view of a panel structure shown with an exemplary depiction of a dot pattern applied thereon along with exemplary depictions of coded markers (each marker in the exemplary depiction having a specific numerical and circular bar code).

Referring to FIG. 4, there is illustrated a panel 410 on which a pattern 411 of dots 412, 413, 414 . . . , has been applied, and also on which applied are a plurality of coded markers 420-431. In the illustration shown in FIG. 4, the coded markers 420-431 include a specific numerical code (see e.g., 424a) as well as a circular bar code (see e.g., 424b). The respective numerical codes and circular bar codes of the markers (such as those markers 420-431 shown in FIG. 4) may be used to represent particular information or data for the part, such as the panel 410, as well as to provide part of the patterning for the digital image correlation structural health analysis. The data may include information, such as, for example, part number, pattern number, serial number. Preferably, the patterning and the codes function as a strain gauge, where imaging of the surface of the part 410 shown in FIG. 4 may be carried out with an analysis of the pattern and its deformation to determine strain on the material.

According to preferred embodiments, the pattern as well as the code markers may be applied onto the structure with the use of paint or ink, and may, according to some preferred embodiments, be applied with a printer. The coating applied, such as ink or paint, preferably is a UV fluorescent paint that is not visible when viewed by a human in conventional lighting conditions (daylight, sunlight, or typical artificial lighting used in buildings). A UV light source preferably is used when the structural health analysis is carried out. The UV light source preferably includes one or more wavelengths that may be used to image the UV paint or ink. A camera having an image sensor that will record the UV applied pattern and codes captures the pattern and codes.

Figure 5:
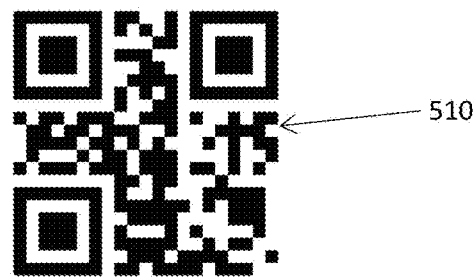
FIG. 5 is a front elevation view of an exemplary depiction of a two-dimensional (2D) code shown comprising a QR code.

Although codes are referred to, examples of codes may include circular bar codes with numeric references as are shown in FIG. 4, as well as a 2D codes, such as the QR code 510 shown in FIG. 5. The codes may be applied by printing onto the substrate surface, which according to some embodiments, may be applied along with the pattern or dots.

According to preferred embodiments, the codes that are applied to the surface, such as the invisible UV applied codes, may be security protected, so that anyone may not decipher the information. For example, the codes may reveal certain information about the structure or object on which they are placed (or reveal information of another, or associated, object). The security-specific coding preferably provides the capability for the UV pattern and codes to be applied on a structure, and be revealed with an appropriate light source, but protects the information against being revealed to anyone that would direct a UV light source to the structure to identify or capture the image.

Referring to FIG. 6, there is illustrated an exemplary implementation of the system, method and devices shown in conjunction with the structural health monitoring of an aircraft 600. The aircraft 600 is shown resting on its landing gear 601,602 (with another portion of the landing gear, like 602 on the opposite side and being hidden from the view). A robotic imaging mechanism is shown comprising a pair of robots 610. Each robot 610 is configured with motors and wheels or treads (see e.g., the left wheels 612, 613, and right wheels 614, 615) for moving the robot 610 to locations around the aircraft 600 so that the aircraft surfaces may be imaged. In the illustration in FIG. 6, two robots 610 are shown, and there may be one or several robots used for an application, depending on the size of the surface and area to be covered, as well as the time frame for conducting the imaging and analysis. The robot 610 may include software or be in communication with a server or computer that includes software that includes the CAD image of the aircraft. The robot 610 may use the reference points of the aircraft 600, preferably the landing gear points, to determine the location of other structures of the aircraft 600, and the location of the pattern and codes being imaged. The pattern and code locations may be determined relative to the position determined by the robot capture of the aircraft landing gear. The landing gear 601, 602 may comprise a particular point of the landing gear from which the location reference measurements may be determined. According to some preferred embodiments, the landing gear 601, 602 provides the reference for current and future imaging, so that the imaged pattern of dots may be determined at time image t0, as well as at a subsequent monitored time t1. The digital image correlation (DIC) is applied to determine whether the pattern or some of the dots or even codes have shifted from their original position. The changes of the dot pattern on the structure at different imaging times is used to determine changes and the extent or changes to the structure.

As shown in FIG. 6, each robot 610 is provided having an imaging component 618, such as a camera, which images the aircraft surfaces. The camera is shown according to a preferred embodiment mounted on the robot 610 and comprising a pair of stereo cameras 620, 621 supported on a frame structure comprising a mount 622 and a first arm 623. In the exemplary illustration shown in FIG. 6, the first arm 623 connects with a second arm 624, which is mounted on a post 625 connecting to a mount or turret 626 that is supported on a base 627. The robot 610 also is provided with a power supply, such as, for example, a battery (e.g., rechargeable battery), or cabling that may follow the robot. Preferably, one or more of the robot base 627, mount 626, arms 623, 624, post 625 and mount 622, may house the power supply. According to other embodiments, a separate component may be provided to house the power supply. The imaging component 618 may include illumination means, such as a light source 630 that illuminates the aircraft 600 with the appropriate wavelength or wavelengths of light that will illuminate the UV pattern and codes on the aircraft 600 so that it may be captured by the camera (e.g., the stereo camera 610, 611). The robot 610 may be controlled by an operator, who may drive the robot 610 to one or more locations around the aircraft 600. According to some embodiments, a robot 610 may be programmed with instructions to carry out autonomous imaging of the aircraft 600. The robots 610 depicted in FIG. 6 use two or more points of the aircraft 600 to establish a reference location. Each robot 610 may have the same or different references location, as the reference location is relative to the physical location of the robot 610. In the example depicted, the robots 610 use the locations of the landing gear 610, 602 of the aircraft 600. Since the landing gear 601, 602 will always be in the same location, this allows the robot 610 to make imaging measurements and record the location of those measurements relative to the landing gear 601, 602. Accordingly, subsequent imaging by the robots 610 also may use the landing gear 601, 602, so that the imaged pattern and codes may be identified at a location relative to the landing gear 601, 602, which is the same relative location as the initial or previous image. The difference in movement of the pattern dots from a prior or initial position to a different position (e.g., caused by the deformity or elongation, or other change to the pattern), is representative of a stress, deformity, and may signify a potential damage condition. The changes of dots in the dot pattern and the pattern are determined to identify the location on the substrate of the structural condition.

Figure 7:
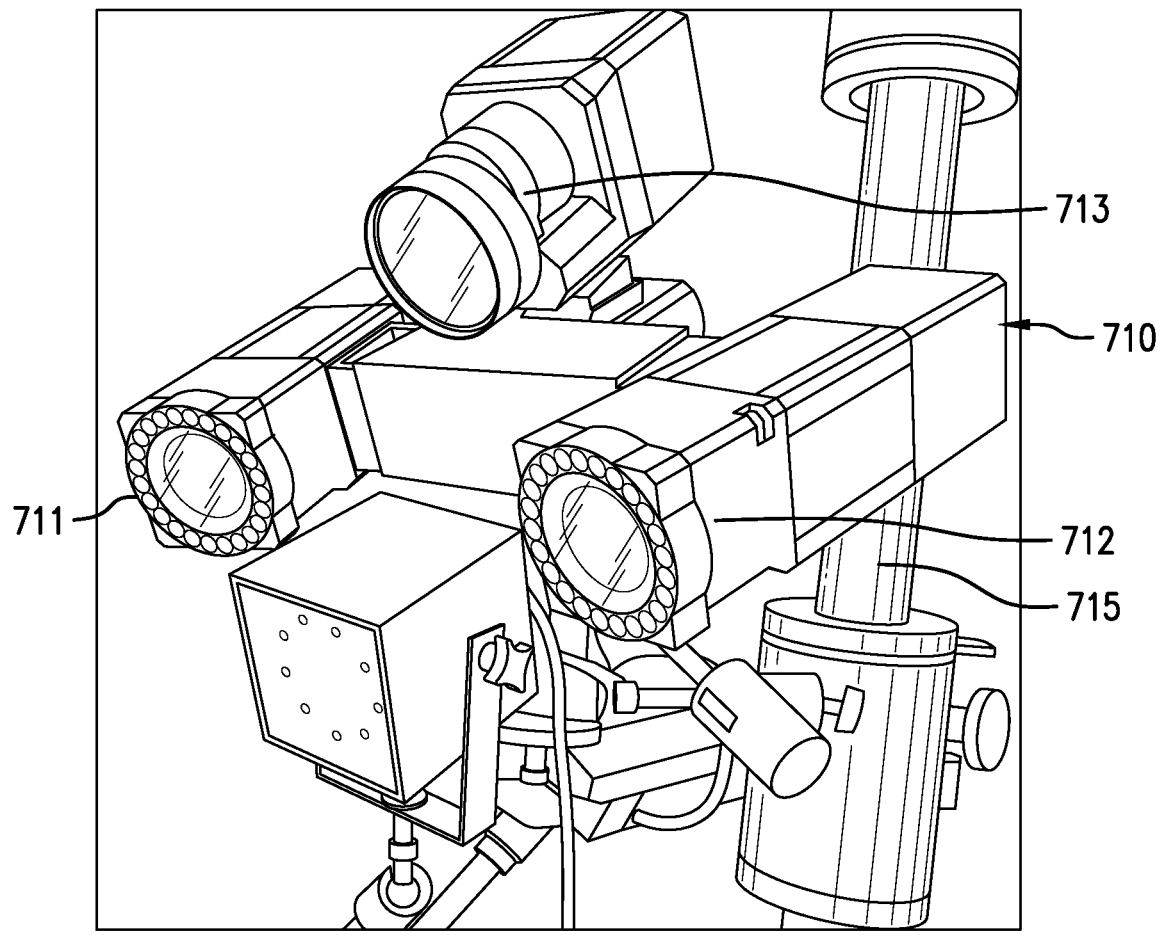
FIG. 7 is an exemplary embodiment of an imaging unit that may be used to carry out imaging (e.g., of the UV pattern and codes), the imaging unit shown comprising a UV ARAMIS Stereo 3D DIC with UV Illumination.

As shown in FIG. 7, an imaging unit 710, comprising a UV ARAMIS Stereo 3D DIC with UV Illumination, is shown. In accordance with embodiments, the ARAMIS Stereo 3D DIC may be provided as a unit that is installed on a robot, such as, for example, the robots 610 shown and described in connection with FIG. 6. Alternatively, the imaging unit 710 may be positioned at a location to image the substrate, for example, where a substrate panel is to be imaged, or a portion of a structure is imaged. According to some embodiments, the image capture of the subject substrate (e.g., an object being monitored), or portion thereof, may be imaged within a single field of view. According to other embodiments, a dual field of view for two or more cameras is used for image capture of the pattern and codes. Referring to FIG. 7, the imaging unit 710 is shown comprising a pair of stereo cameras, 711, 712 and an illumination source 713, which preferably may comprise a UV light source. In the exemplary depiction illustrated in FIG. 7, the imaging unit 710 is shown supported on a frame 715.

Figures 8, 9:
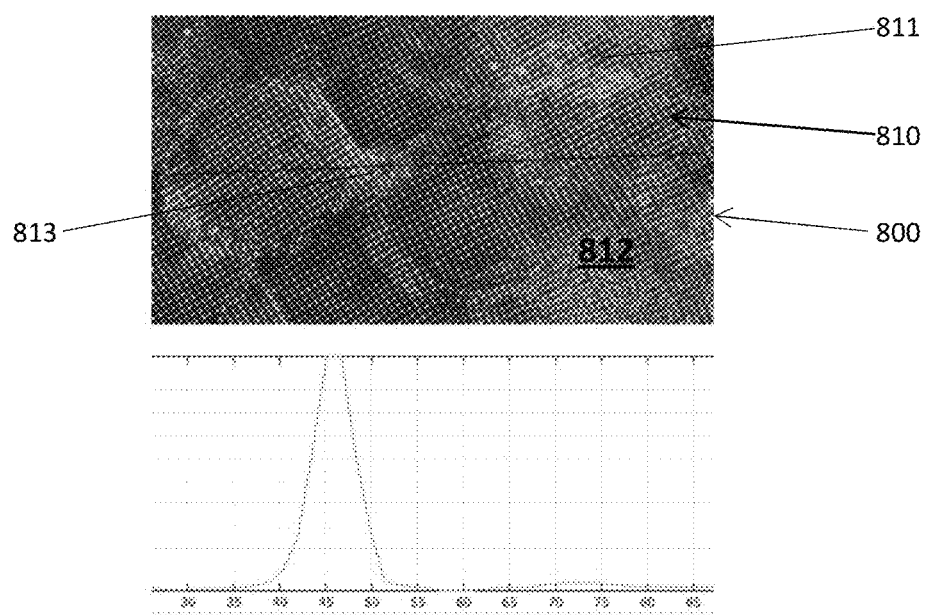
FIG. 8 is an exemplary depiction of a an image recorded of a structure, showing the capture of the image with ARAMIS employed to detect barely visible damage (BVD) under UV illumination.
FIG. 9 illustrates a graph showing a plot of the strain corresponding to the image of FIG. 8.

Referring to FIG. 8, an exemplary depiction of an image 800 recorded of a structure is shown, showing the capture of the image 800 with an imaging unit, such as the ARAMIS unit 710 depicted in FIG. 7, employed to detect barely visible damage (BVD) under UV illumination. The image 800 may represent a screen of a computer, or printout. The image 800 shows a structure 810 with a dot pattern 811 on the surface 812. The imaging and the identification of a strain or other condition, represented by the center area 813 on the image that is red (or other color on the viewing screen or printout) to identify the area of potential condition, such as strain or defect. The structural health analysis preferably captures the image and pattern of dots 811 on the surface 812. However, where there is a detected variation (e.g., from a known prior position of the dots, e.g., from a prior imaging capture), the condition or defect may be identified and indicated in a report, visual depiction or other indicating mechanism.

FIG. 9 illustrates a graph showing a plot of the strain corresponding to the image of FIG. 8, and identifies a peak indicating a strain condition has been detected. FIG. 9 is another way to identify and or represent the detection and determination of a condition that may be detected using structural health monitoring, in accordance with the system, method and devices herein.

According to some preferred embodiments methods, systems and devices are provided for conducting optical structural health monitoring that uses both a 3D imaging system with imaging components (cameras, light source), such as ARAMIS (see e.g., FIG. 7) and non destructive thermography (Thermography NDT), calibrated together, and according to preferred embodiments, coupled with the RVAT database, for life long condition monitoring. As discussed herein, the RVAT database contains the information for the as-built structure being monitored, and preferably includes the CAD coordinates as well as the actual structure (as-built), which may be different than the CAD for the design of the structure. ARAMIS 3D DIC (digital image correlation) is implemented to detect delamination prior to when Thermography NDT sees any delamination. However, the present system, methods and devices provide DIC and thermography in order to make determinations about the structural health. For example, the digital imaging system, such as the ARAMIS 3D DIC (which comprises software and imaging components that capture and map in coordinates the object being monitored), as well as the NDT thermography together they tell the whole story of the part or structure being monitored. The thermography also may be carried out using the ARAMIS system with a thermal imaging source (e.g., infra-red) and capture source (camera or cameras), to obtain the thermal imaging information (see e.g., FIG. 7). According to preferred embodiments, ARAMIS provides the 3D perspective to CAD to the Thermography, so that defects may be precisely located, not currently possible. The combined results show, deformation (dents), strain (material stressing), and delaminations (laminar failure), all in 3D coordinates (known location on vehicle and which specific structure). The RVAT database may be updated each time structural health monitoring is conducted for an object (or substrate). The historical information, from the RVAT database, of previous inspections for each point, provides hugely greater sensitivity to early detection of defects. Another benefit obtained with the present method, system and devices is the elimination or minimization of not false positives from existing structure. ARAMIS and Thermography also validate each other's measurements for critical defects. In addition, the validation verses FEA is highly powerful for the ARAMIS Thermography result determination of defect effectivity.

Figure 11:
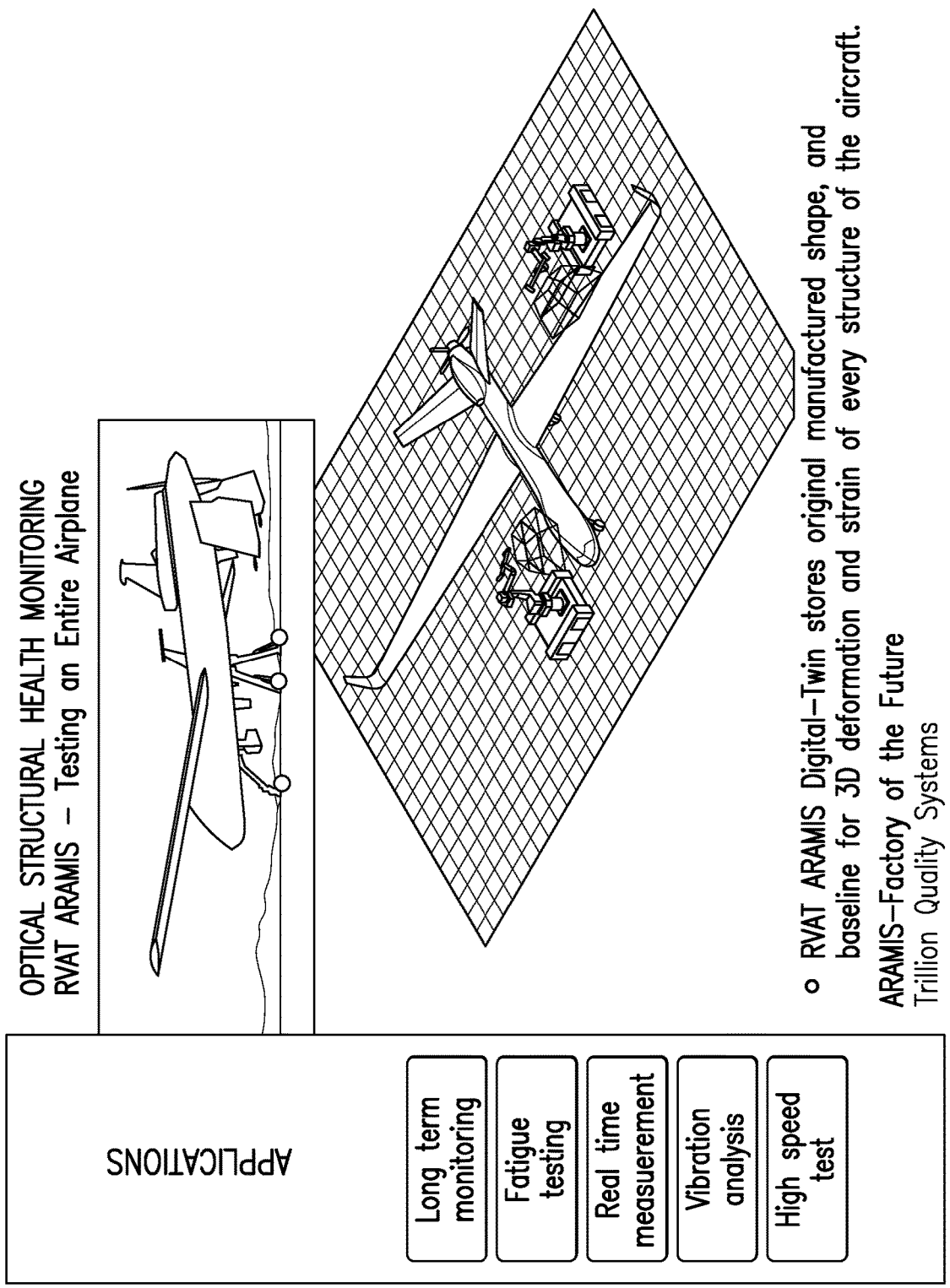
FIG. 11 is an illustration of an aircraft.
Figure 12:
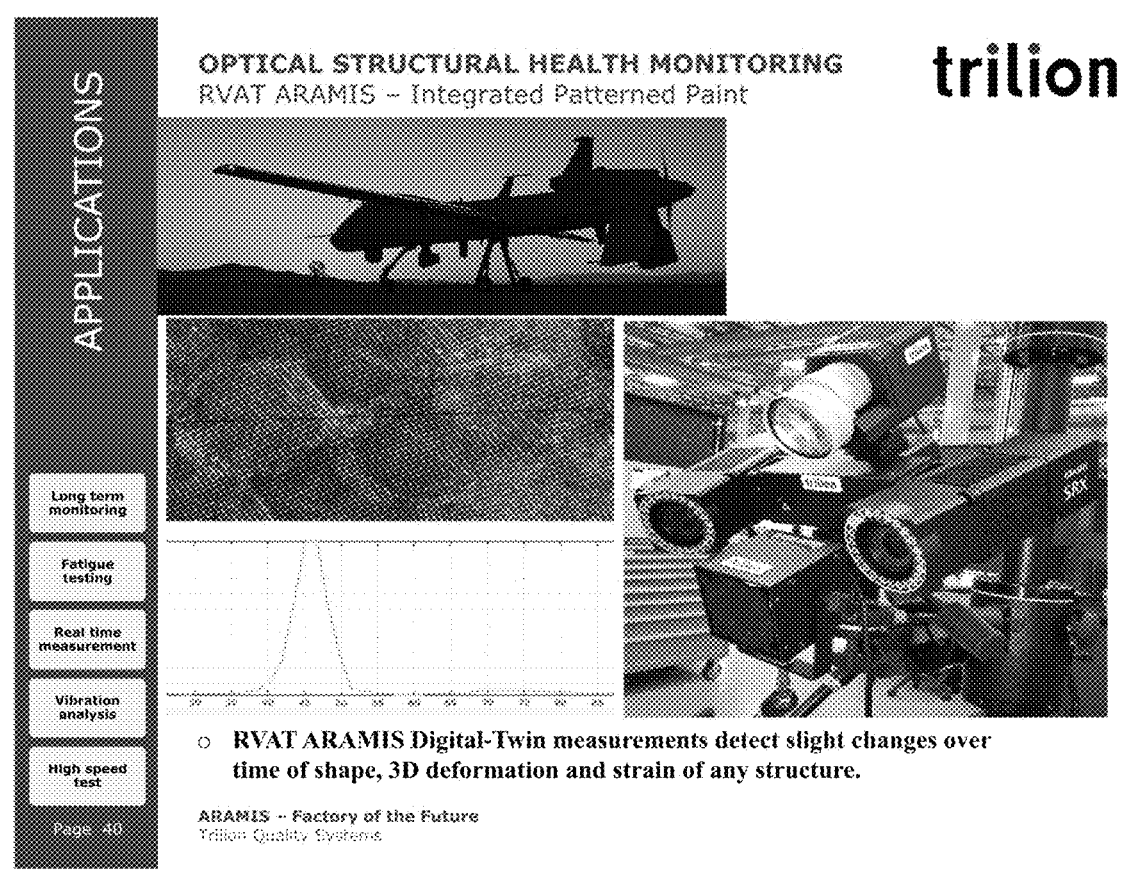
Figure 13:
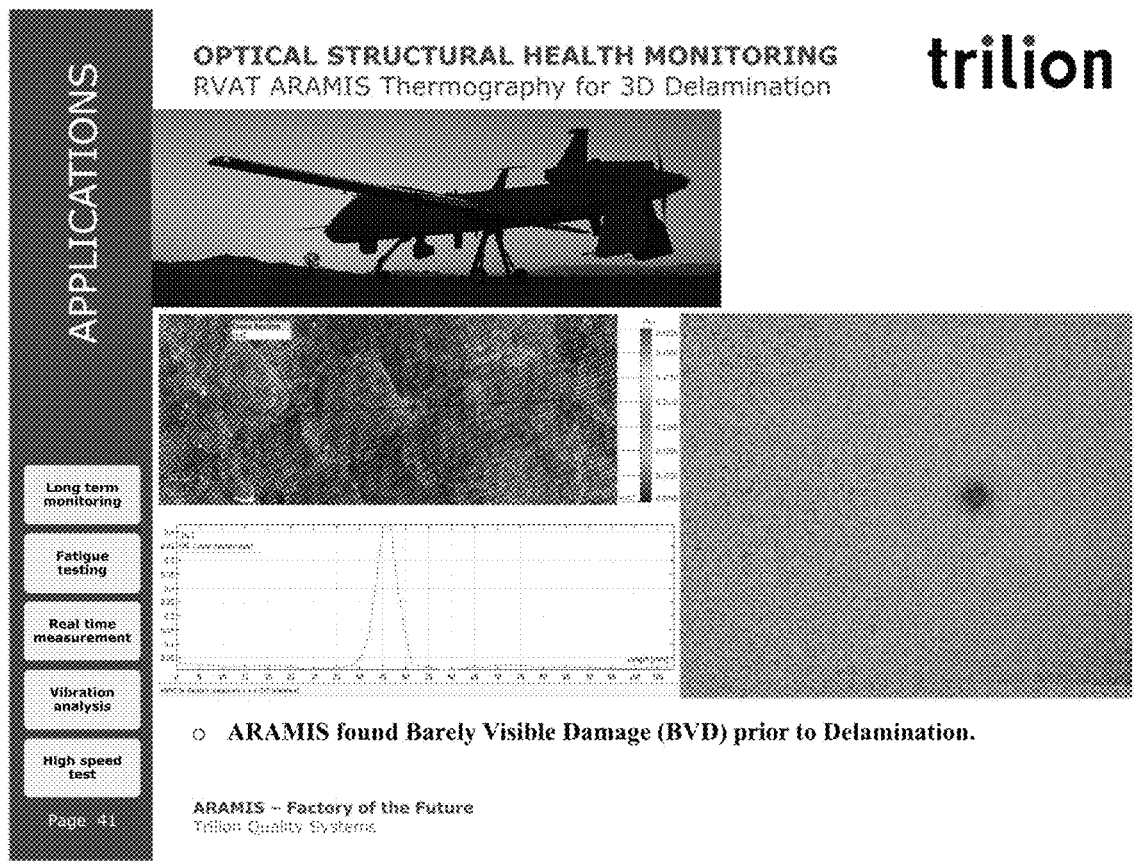
FIG. 13 is an example of detection of barely visible damage prior to delamination.
Figure 14:
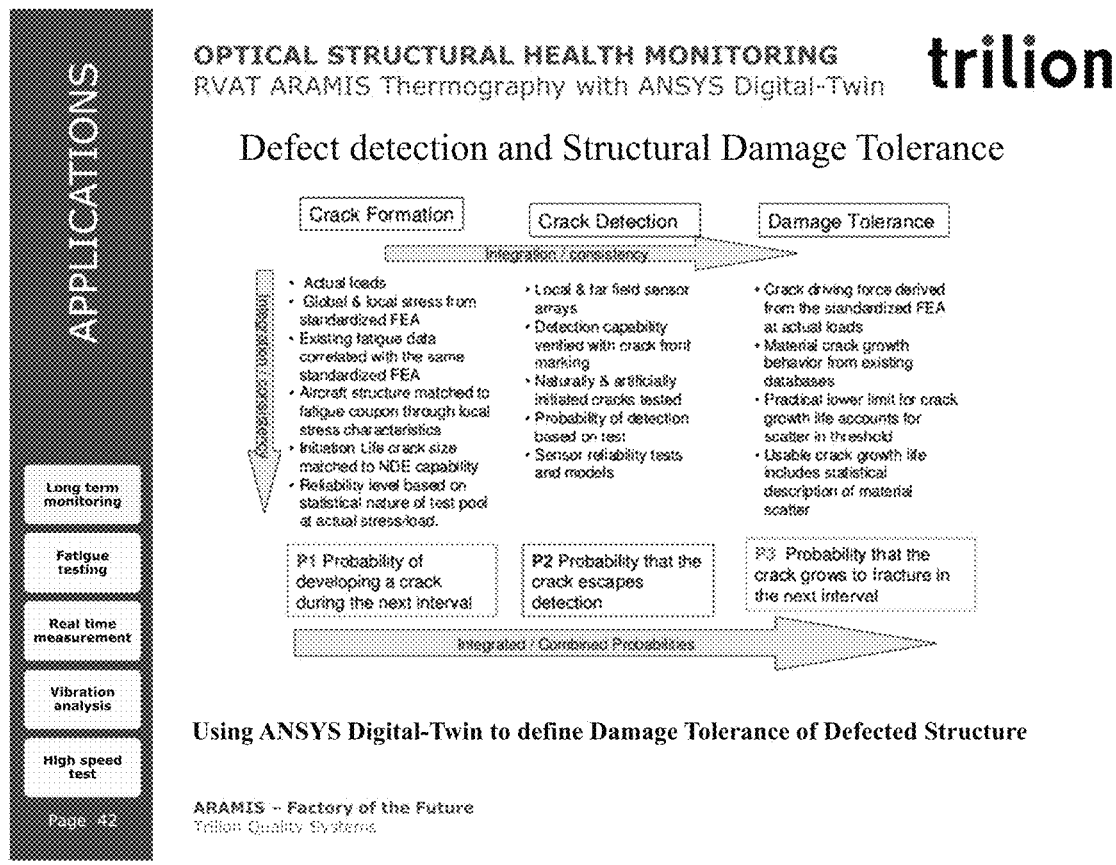
FIG. 14 is schematic diagram depicting damage tolerance of a defected structure.
Figure 15:
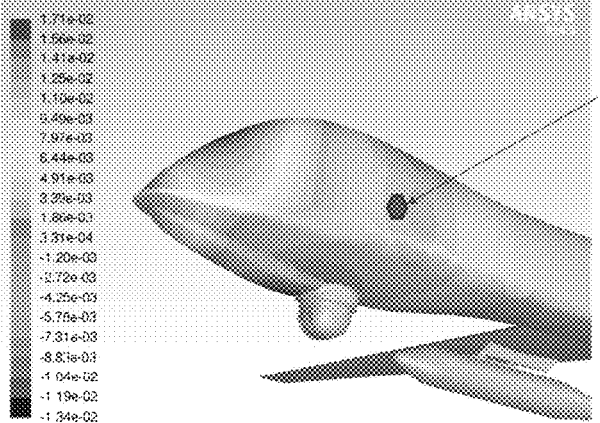
FIG. 15 is an illustration of an image of an aircraft illustrating the use of the Digital-Twin to define damage tolerances, showing detection of a defect.
Figure 16:
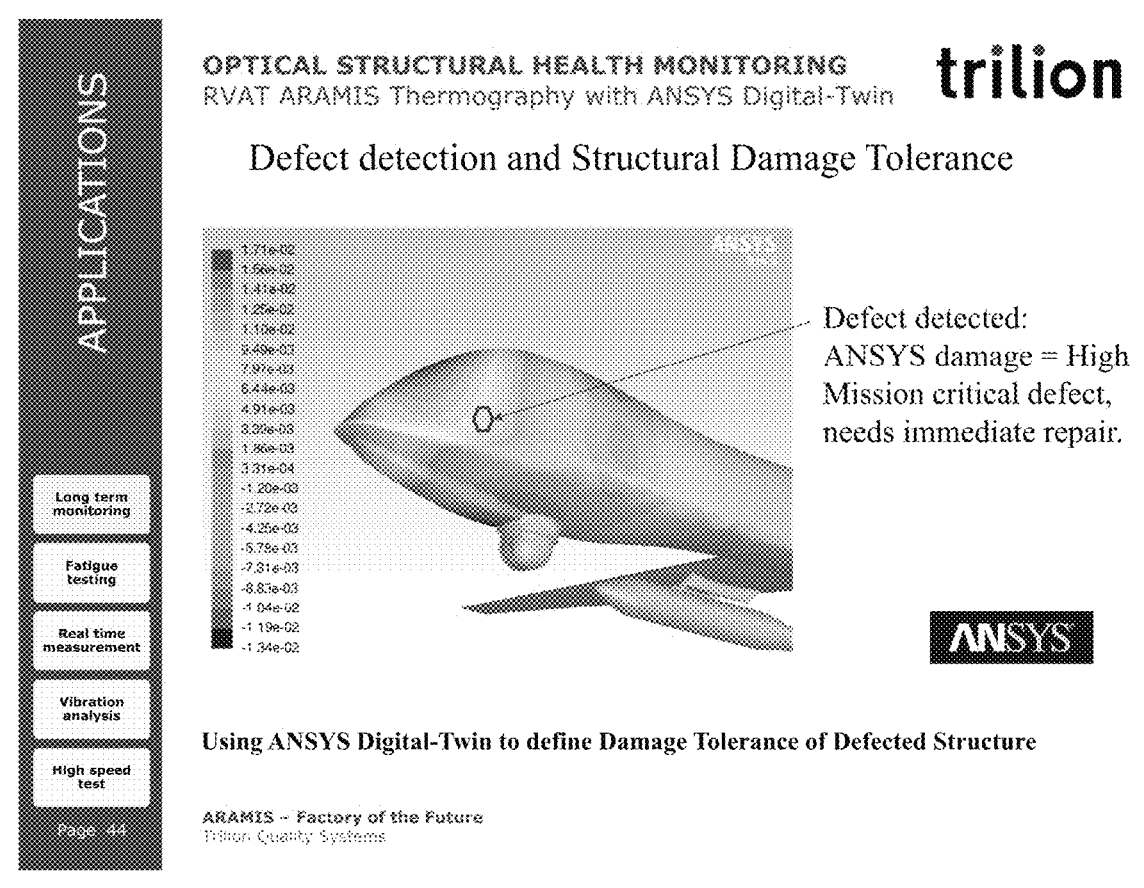

Referring to FIGS. 11-16, there is illustrated in FIG. 11, the illustration of the aircraft 600 shown in FIG. 6. The RVAT ARAMIS Digital-Twin stores the original manufactured shape, and provides the baseline for 3D deformation and strain for every structure of the aircraft. Referring to FIG. 12, the RVAT ARAMIS Digital-Twin measurements may detect slight changes over time of shape, 3D deformation and strain for an object, such as the aircraft depicted. As shown in FIG. 13, the implementation of the system, method and devices illustrates detection of barely visible damage (BVD) to a structure, which may be detected prior to delamination. The damage is indicated and its location on the structure identified. Referring to FIG. 14, defect detection and structural damage tolerance are depicted. The system may be used to follow and predict potential outcomes for structures, and through the detection of the damage may also qualify or quantify the damage and extent of damage, so that determinations may be made for potential remedial action (repair, replacement, further testing, etc.). This is illustrated in FIG. 14, where limits and thresholds may be established from the use of the Digital-Twin (ANSYS Digital-Twin) to define the damage tolerance of a structure. Referring to FIGS. 15 and 16, in each image, a detected defect is illustrated in an aircraft. The ANSYS Digital-Twin is applied with the ARAMIS 3D DIC and Thermography NDT to obtain the information that reveals detection of a defect in the aircraft. The defect is located in the Digital-Twin, an represents a low damage indication (FIG. 15). In this instance, the information indicates that the defect may be addressed at the next scheduled maintenance stop for the aircraft. The determination of the defect threshold may determine whether the defect needs to be addressed, for example where the defect is located in the wing structure, or other critical location, such as for example, the defect detected in FIG. 16.

Preferred embodiments of the system, method and devices, use an invisible pattern to measure with an optical measurement method. An imaging component, such as a camera, preferably is used in conjunction with a light source that provides a suitable wavelength of light output that may be delivered to the substrate or surface being measured. The optical measurement method may be a method that obtains and stores pattern location at a particular point in time, and images to obtain and store the pattern location at a subsequent point in time, such as after activity or stress loading has taken place. The imaging information, including the pattern locations of the indicia forming the pattern are correlated to determine whether changes have taken place, and where those changes have occurred, and the extent of the changes and directions. The information may be used to determine strain and whether the part or article is suitable for continued service, or whether repairs or replacements are necessary. A UV paint or ink is used to apply the dot pattern to the structure surface, so that the dot pattern may be measured on the structure surface. A database is constructed and stores the historical results of the imaged structure and pattern thereon (as well as codes), and preferably stores each imaged measurement of the pattern, so that the database contains historical results that measure slight changes for structural health monitoring. The stored imaging is coupled with analytics, and preferably software containing instructions for comparing the images is provided. A computer may be used to store the images, as well as process the images to compare historical results of the pattern changes, and identify changes in the structure.

According to preferred embodiments, the imaged structure is compared with the CAD of the structure for determining the location of the pattern and codes located on the structure. The comparison may be made of the original or prior pattern image which may be an image of the pattern that includes the CAD coordinates, or has been applied to the CAD. The CAD of the structure preferably is generated to include the image dot pattern and codes as part of the CAD, wherein a CAD-correlated related image and file (CAD-CM) are generated. The imaged structure may be monitored for structural health by imaging the structure and pattern thereon and comparing it with the prior CAD (that includes the prior imaged pattern). The creation of the CAD-coordinated related image and file is generated from the UV pattern of dots and codes captured with an imaging device, such as a camera (or cameras), and a UV light source. The CAD-CM is stored and preferably is included within a database to provide historical accounts of the structure being monitored (e.g., such as an aircraft).

The imaged structure also may be used for comparison in a finite element analysis (FEA), for understanding local 3D displacement and strain requirements and limits. For example, where strain limits or requirements are identified, the comparison of the imaged pattern and changes that may be identified during subsequent health monitoring of the structure and pattern.

According to some embodiments, the system is configured with instructions for implementing machine learning that learns human analysis of historical results. The machine learning may track the human analysis, such as the human's coordination between images, including for example, when determinations based on the image correlations are inspected by humans. The machine may store the types of data point relationships that the human has determined to represent a condition of interest. The machine then may automatically, without the further human input, on subsequent imaging evaluations analyze and correlate the images (a prior image and a current or subsequent image), for the deviation or pattern change determined to be of interest (based on the prior human activities, but which the machine has learned). Therefore the machine, such as a computer with software containing instructions for carrying out the evaluation of the image data and the ability to change the software to include reporting and detection of comparisons that have been learned, may provide an output or report of the structural health of the object (including pointing to one or more areas of potential deviations or damage indications).

The system also may obtain and store image patterns and may provide a spatial alignment of an image with one or more historical images. The spatial alignment preferably may be carried out using targets, such as coded targets. For example, coded targets may comprise a QR code or other 2 dimensional code, such as the codes shown and described herein, which may be applied as part of or along with the pattern. The coded targets may be aligned to provide a spatial alignment of historical images. The pattern may be observed in connection with one or more prior patterns. The code may include a QR code, which provides information as to the position of the imaged part, and the code also may provide information about the part itself. For example, a scan of an imaged structure may identify the structure based on the QR code scan. The system then may immediately proceed to call up the information for the structure from a library and/or database for the structure, and identify the particular structure.

The imaging may take place using one or more robots (such as, for example, as shown and described in connection with FIG. 6), to provide digital image correlation (DIC). The robot positioning for the imaging preferably may rely on a portion of the structure that remains in the same location (reference structure), so that the other portions of the structure may be imaged and their locations determined relative to the reference structure portion. The robot may move and identify its position based on its present location relative to the reference structure. The movement of the robot enables imaging of a pattern that has been applied to a large structure, such as for example, an aircraft. Although the robot will capture separate points of view for the same structure, the dot pattern and code locations are identified based on the robot's referential determined location. The CAD coordinates also may be used and a file created that contains the imaged patterns that the robot has captured using an imaging unit (e.g., camera and light source), to image the UV applied pattern of the structure.

According to some embodiments, the patterning and coding may be used to align the robot. For example, codes may contain information that identifies a particular location of the structure. The robot may be programmed to search for a particular code, or alternatively, when the robot imaging unit encounters a particular code, the code is recognized, and the robot is aligned to image the structure or portion of the structure. In addition, the codes may be used to designate one or more structural portions of interest, or that may be imaged at different time intervals. In this manner, for example, the robot may carry out imaging by imaging the structure, and image in accordance with a set of instructions that direct the robot to image one or more particular portions of the structure. For example, if the robot is to image the vertical stabilizer of an aircraft, the robot may image and scan the aircraft until it identifies a QR code that indicates that it is in the location of the vertical stabilizer. The robot may image one or more other QR codes, as directed, if needed, to identify the location of the aircraft (the stabilizer location) to be imaged.

According to some embodiments, the system, method and devices may include a Sample Coded Marker, each with specific numerical and circular bar code. Some examples of markers are shown in FIG. 4, such as the markers 420-431). The marker may be applied on the structure through painting.

Figure 10:
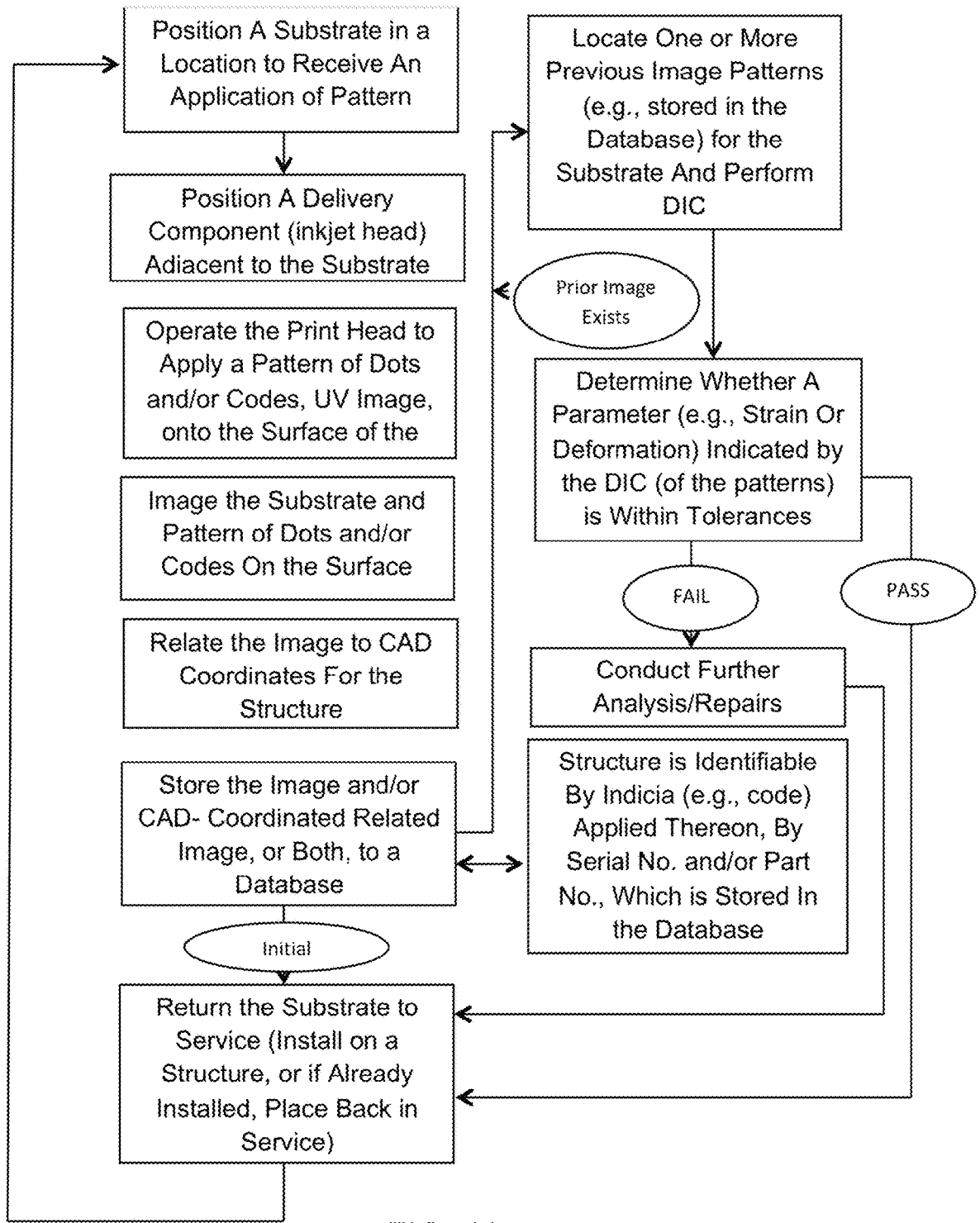
FIG. 10 is a flow diagram illustrating an exemplary depiction of the system and method for monitoring the structural health of an object.

Referring to FIG. 10, a flow diagram is illustrated, setting forth steps of an exemplary embodiment of structural health monitoring carried out in accordance with an embodiment of the invention. The systems, such as those shown and described herein may be used to carry out the method. The method depicted involves conducting structure health monitoring by evaluating a substrate for strain and/or deformation. The substrate is positioned at a location, which may be a table, frame or other support (e.g., fixture during assembly or manufacturing). A mechanism to apply a pattern and/or codes with a UV coating (such as ink or paint) depicted comprising a print head is positioned adjacent to the substrate. The print head may be operated to deliver the pattern with a series of on and off applications from the print head nozzle or nozzles (or other applicator). The operation of the print head also may include moving the print head along vertical, horizontal, or angled axes (e.g., x-y-z axis), to deliver a pattern of dots and apply codes on the surface of the substrate. Once the pattern is applied using the UV paint or ink, the substrate is imaged, capturing the pattern and codes. Preferred embodiments, as represented in the flow diagram of FIG. 10, preferably image the pattern and coordinate the pattern with the CAD image file for the substrate being imaged (or portion of the substrate being imaged—where a pattern is applied to a portion of the substrate). Preferably, the CAD-coordinated related image (e.g., CAD-CRI, with the pattern represented in the CAD coordinates), as well as the CAD images in some embodiments, are stored in the database. If the method is an initial patterning of the substrate, upon completion of the patterning and storage of the image, the substrate may be returned to service. (According to some alternate embodiments, the substrate may undergo further testing, or assembly, as the system may be used to pattern an image during assembly, and then conduct the structural health monitoring over an assembly operation.)

Referring to FIG. 10, the structure is identified by indicia, which preferably corresponds with information stored in a database. The method is depicted continuing where one or more prior images are located for the substrate, and DIC is carried out, and a determination made to ascertain whether the strain or deformation or other condition detected is within tolerances. If it passes, then the next action may proceed, which, in the exemplary depiction is a return of the structure to service. However, if the structure should fail the analysis, further analysis is conducted, and/or repairs may be made, or the structure is taken out of service.

According to some embodiments, the CAD-CRI preferably may be stored and generated to include the CAD coordinates for the structure, and may include baseline and historical CAD coordinates for the structure. The database preferably may include the historical CAD information, as well as include the information for conducting structural health monitoring of the structure or object and the record of changes over time (which may be changes or occurrences of conditions, such as strain or deformations, or movements of the object or portions thereof). The dot patterns and codes may be stored in the database, as part of the CAD-CM image and file. The dot pattern and codes also may be stored and maintained so that images may be generated to graphically represent the changes to an operator. According to some implementations, the CAD and CRI may be spatially synchronized, for example, through a QR code.

The database also identifies corresponding part information, part. number, serial number, model number, dates, which may be associated in the database with one or more of the codes that are printed on the substrate. Therefore, when the image of the substrate is captured with a UV imaging source (e.g., camera with a UV image sensor and UV light source), the UV applied codes are also captured and the system, which preferably includes a computer with a hardware processor, memory, and storage means, identifies the code and uses the code to identify the substrate (structure or part) based on the information within the database. The imaging of the structure also may be stored, so that each image of the structure, and its pattern and codes are stored for each time, and may provide a structural health history for the part being evaluated. In the case where the substrate is undergoing an initial pattern imaging, the substrate is returned to or placed into service, once the imaging information has been obtained. In the case, however, where a prior imaging capture of the pattern and codes has taken place, a structural health analysis may be conducted. The present image is stored, preferably as a CAD-coordinated related image (CAD-CRI). A prior image of the substrate (e.g., the part being evaluated) is located within the database. This may be accomplished using the UV code detected for the part being imaged for analysis, and matching that code to a reference in the database. The system, preferably using a computer (e.g., server), identifies the code and uses the code to match the code to a corresponding part. The part therefore has associated with it the structural health history, which preferably includes prior image scans. DIC is performed for the image obtained, based on a baseline image (which may be one or more previously obtained images preferably stored in the database). According to preferred embodiments, the images are stored in a CAD coordinated related form. The DIC may be carried out with the CAD images showing the changes as well as identifications between coordinates that show threshold structural strain, deformation, or other parameter being evaluated. The method also may include determining, from the DIC, whether a parameter is within an acceptable tolerance or whether it is out of range. For example, as depicted, where the tolerance is met, the substrate, such as a structure (panel, assembly, aircraft, or vehicle) may be returned to service (or installed back onto the assembly from which it was detached). In the case of a failure to meet tolerances, further analysis and testing is conducted, and possible repairs are indicated or performed. The system and method also may be used during an assembly to determine whether the structure meets the threshold parameters or tolerances to the placed into service or used, and may be continued to be monitored through subsequent imaging of the patterns and codes.

CAD-CM can be spatial synchronized with the FEA (Finite Element Model) which models the operational stresses (forces) and strains (material response). With the FEA data, defects detected can be defined by their effectivity to the operational structure. Typically, defects found will drive repair if a certain size, independent of the loading of that structure, based on material criteria and worst loads. But with local FEA analysis, a defect can be defined as immediately repairable if in a high stress area, or programmed for future maintenance if not in a high stress area. This allows for advanced programmed maintenance, focused preventative maintenance and life extension.

Although implementations have been shown and described in connection with invisible coatings, such as, for example, UV coatings (paints and ink), according to other embodiments, the system, method and devices may be implemented to carry out structural health monitoring, with visible coatings applied to the substrate (with the features shown and described in connection with the UV coated embodiments). These implementations may be used where the object being patterned and monitored is not in public use, or other situations where the pattern and/or code visibility does not need to be hidden.

What is claimed is:

1. A method for conducting structural health monitoring of a substrate, the substrate comprising the object to be monitored for structural health, comprising:
   a) optically capturing a pattern of a substrate, wherein the substrate has a pattern applied thereon, and wherein the pattern includes a pattern of random indicia and at least one or more codes, and wherein a CAD file of the substrate is generated or provided;
   b) optically measuring the pattern to determine the condition of the substrate;
   c) providing one or more optically discernable codes in the captured image pattern of the substrate, d) wherein said pattern of the substrate includes one or more of the codes that are the same one or more codes provided in the captured image pattern of the substrate;

e) wherein said pattern comprises indicia in addition to said one or more codes; and f) wherein optically measuring the pattern to determine the condition of the substrate includes aligning the one or more codes, and carrying out a comparison of historical captures of the pattern to determine whether changes have taken place in the structure; and g) wherein said substrate comprises the object to be tested;

h) wherein said at least one or more codes provide the position and alignment of the substrate in 3D coordinate space, said code being mapped to coordinates of the CAD file for the substrate;

i) wherein said one or more codes along with said indicia are compared to the respective corresponding historical condition of said respective one or more codes and indicia to determine whether changes have taken place in the structure at the locations on the structure that correspond with the pattern locations; and j) wherein said code comprises at least one QR code defining a QR code area of the pattern on the substrate on which the QR code is located, and wherein structural health monitoring uses said at least one QR code to identify a structural health condition within the area of the structure that is within the QR code area.

2. The method of claim 1, wherein the one or more codes comprise a locational reference and comprise indicia for strain measurement, wherein said locational reference represents information about the location of the substrate or portion thereof being monitored.

3. A method for conducting structural health monitoring of a substrate, the substrate comprising the object to be monitored for structural health, comprising:

a) designating a substrate or portion thereof to be monitored, providing or generating a CAD file of the substrate;

b) applying a pattern on the substrate;

c) imaging the pattern with equipment that captures the image of the pattern;

d) storing the image captured in step c);

e) making structural health determinations of the substrate from changes in the substrate using the pattern applied on the substrate in step b) to indicate changes to the substrate; and f) wherein said at least one or more codes provide the position and alignment of the substrate in 3D coordinate space, said code being mapped to coordinates of a CAD file for the substrate;

g) wherein said pattern comprises said at least one or more codes and other indicia, said at least one or more codes and said other indicia being used in step e) to determine whether changes have taken place in the substrate; and h) wherein said at least one or more codes comprises at least one QR code defining a QR code area of the pattern on the substrate on which the QR code is located, and wherein changes in the substrate at the location of the substrate on which the QR code is applied are used to make structural health determinations of the substrate based on changes to the QR code that take place within the location of the structure that is within the QR code area.

4. The method of claim 3, wherein the other indicia forming said pattern comprises a pattern of random dots.

5. The method of claim 4, wherein the substrate is an aircraft having one or more exterior surfaces, and wherein the invisible pattern is applied to at least some of the exterior surfaces of the aircraft.

6. The method of claim 5, wherein the aircraft has logos or other markings thereon, and wherein the invisible pattern is applied over the logos or other markings, and wherein after application of the invisible pattern, the logos or other markings remain visible.

7. The method of claim 3, wherein said pattern comprises an invisible pattern.

8. The method of claim 7, wherein the invisible pattern comprises a pattern of a UV fluorescing coating.

9. The method of claim 8, wherein the UV coating is a UV paint or dye.

10. The method of claim 8, wherein the pattern is formed in the pattern areas by applying a UV paint.

11. The method of claim 3, including storing the image captured in step c) in a database.

12. The method of claim 11, wherein steps c) and d) are repeated over time intervals, and wherein monitoring of one or more conditions of the structure or portion thereof is carried out.

13. The method of claim 12, wherein monitoring one or more conditions comprises conducting Digital Image Correlation (DIC) or thermography NDT to compare the historical imaging results to current.

14. The method of claim 13, including determining whether slight changes of the structure or portion thereof have taken place.

15. The method of claim 14, including implementing machine learning by operating a computer with software containing instructions to determine the structural changes that have been indicated by one or more prior actions of an operator of the system to be of interest or warrant a closer view, and applying the parameters of the changes to the compared images of the structure or portion thereof that caused the operator of the system to be of interest or warrant a closer view to the software so that the software programs itself through changes that the software makes to itself, to detect those changes when they are present in images being compared, in a further analysis.

16. The method of claim 15, wherein at least one coded marker is embedded in the substrate image for alignment with previous data.

17. The method of claim 16, including implementing machine learning by operating a computer with software containing instructions to determine the structural changes that have been indicated by one or more prior actions of an operator of the system to be of interest or warrant a closer view, and applying the parameters of the changes to the compared images of the structure or portion thereof that caused the operator of the system to be of interest or warrant a closer view to the software so that the software programs itself through changes that the software makes to itself, to detect those changes when they are present in images being compared, in a further analysis.

18. The method of claim 15, wherein structural changes comprise one or more of changes in shape, in 3D deformation, surface strain, or NDT results.

19. The method of claim 13, wherein a robot is positioned for conducting DIC imaging of the substrate or portion thereof.

20. The method of claim 13, wherein the robot is used to carry out imaging of the substrate or portion thereof.

21. The method of claim 20, wherein the robot uses patterning or coding to align the position of the robot relative to the structure or portion thereof, and wherein the patterning or coding used to align the robot position comprises the pattern applied to the substrate in step b).

22. The method of claim 21, wherein the robot references the CAD file of the stored coordinates for the structure or portion thereof being monitored, and wherein the robot locates one or more points of the structure or portion thereof to align the position of the robot.

23. The method of claim 21, including applying the invisible pattern to an aircraft, wherein a first gross alignment of the robot is carried out relative to the aircraft, and wherein a second alignment is carried out to align the robot to one or more points, locations, or components of the aircraft, wherein the aircraft has landing gear, and wherein, for the first gross alignment, the robot locates the landing gear of the aircraft and aligns the position of the robot relative to the landing gear, and wherein for the second alignment, the robot locates one or more points, locations, or components of the aircraft, and aligns the robot to said one or more points, locations, or components of the aircraft.

24. The method of claim 23, wherein said pattern is applied manually, or with the robot.

25. The method of claim 12, wherein the image stored in the database is stored as a CAD-coordinated related image (CAD-CRI) that includes coordinates of the substrate or portion thereof and coordinates of the pattern.

26. The method of claim 25, wherein the pattern further comprises at least one code.

27. The method of claim 26, wherein the code represents information about the location of the substrate or portion thereof.

28. The method of claim 12, including conducting a finite element analysis (FEA) comparison to determine local 3D displacement and strain requirements and limits.

29. The method of claim 28, wherein said database includes 3D displacement and strain requirements and limits for the substrate or portion thereof being monitored, and wherein the method includes determining from displacements between the invisible pattern imaged at at least two different time intervals, whether a threshold limit or requirement has been met or exceeded.

30. The method of claim 29, wherein said 3D displacement and strain requirements and limits for the substrate or portion thereof being monitored are compared against one or more of a manufacturing reference, delivery reference, previous year reference, and previous inspection reference.

31. The method of claim 12, including performing a spatial alignment of a captured image and one or more historical images by aligning the invisible pattern or portion of the invisible pattern.

32. The method of claim 31, including applying with an invisible coating one or more Coded Targets, and wherein performing the spatial alignment is carried out using the one or more Coded Targets in the image.

33. The method of claim 32, wherein the one or more Coded Targets are applied as part of the invisible pattern.

34. The method of claim 31, including applying with an invisible coating one or more QR Code Targets, and wherein performing the spatial alignment is carried out using the one or more QR Code Targets in the image.

35. The method of claim 34, wherein the one or more QR Code Targets are applied as part of the invisible pattern.

36. The method of claim 3, wherein the pattern comprises a random dot pattern.

37. The method of claim 3, wherein the pattern comprises at least one code.

38. The method of claim 3, wherein the pattern comprises one or more of a pattern of random dots and one or more codes, and wherein said pattern comprises an invisible pattern, and wherein said codes contain information, and wherein said information is security protected on the codes, so that if the code is made visible, the information is protected from being understood.

39. The method of claim 38, including a decoder that decodes the security protected information of the code.

40. The method of claim 3, wherein at least one pattern or portion thereof, or code, is applied to the substrate using a coating that is visible under a first wavelength and wherein at least one other second pattern or portion thereof or other code, is applied to the substrate using a coating that is visible under a second wavelength.

41. The method of claim 40, wherein said codes are applied using a coating that is visible under a wavelength that is different than the wavelength under which the pattern may be visible.

42. The method of claim 3, wherein the pattern applied on the substrate comprises one or more of a pattern of random dots and one or more codes, and wherein said pattern is applied to the substrate in one or more locations to be monitored, wherein steps c) and d) are repeated over time intervals, and wherein monitoring of one or more conditions of the structure or portion thereof is carried out by conducting Digital Image Correlation (DIC) to compare the imaging result of the pattern at a point in time to the historical imaging results of a historic image of the pattern, wherein said historic image comprises a baseline and wherein changes in the pattern of random dots and one or more codes are measured to determine one or more structural health parameters of the group consisting of: strain, deformation and stresses; and predicting a potential failure of said structure at a monitored location based on said determination of said one or more structural health parameters.

* * * * *